(12) United States Patent
Miyamoto et al.

(10) Patent No.: US 12,198,686 B2
(45) Date of Patent: Jan. 14, 2025

(54) SOUND CROSSTALK SUPPRESSION DEVICE AND SOUND CROSSTALK SUPPRESSION METHOD

(71) Applicant: PANASONIC INTELLECTUAL PROPERTY MANAGEMENT CO., LTD., Osaka (JP)

(72) Inventors: Masanari Miyamoto, Fukuoka (JP); Shinichi Yuzuriha, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 271 days.

(21) Appl. No.: 17/778,299

(22) PCT Filed: Nov. 16, 2020

(86) PCT No.: PCT/JP2020/042674
§ 371 (c)(1),
(2) Date: May 19, 2022

(87) PCT Pub. No.: WO2021/100670
PCT Pub. Date: May 27, 2021

(65) Prior Publication Data
US 2023/0026003 A1    Jan. 26, 2023

(30) Foreign Application Priority Data
Nov. 21, 2019 (JP) ................... 2019-210689

(51) Int. Cl.
*G10L 21/0208* (2013.01)
*G10L 15/20* (2006.01)
*G10L 21/0272* (2013.01)

(52) U.S. Cl.
CPC .................... *G10L 15/20* (2013.01)

(58) Field of Classification Search
CPC ............. G10L 21/0208; G10L 21/0216; G10L 21/0272; G10L 21/028; G10L 2021/02087
(Continued)

(56) References Cited

U.S. PATENT DOCUMENTS 6,674,864 B1 * 1/2004 Kitamura ................. H04R 3/14
                                                          381/103
9,881,632 B1 * 1/2018 Every ................. G10L 21/0232
(Continued)

FOREIGN PATENT DOCUMENTS

| JP | 2006-039108 A | 2/2006 |
| JP | 2006-039447 | 2/2006 |

(Continued)

OTHER PUBLICATIONS

International Search Report (including English Language Translation), mailed Dec. 28, 2020, by the Japan Patent Office (JPO), in International Application No. PCT/JP2020/042674.

*Primary Examiner* — Martin Lerner
(74) *Attorney, Agent, or Firm* — Greenblum and Bernstein, P.L.C.

(57) ABSTRACT

A sound crosstalk suppression device includes: a speaker analysis unit configured to analyze a speaker situation in a closed space based on voice signals respectively collected by a plurality of microphones arranged in the closed space; a filter update unit that includes a filter configured to generate a suppression signal of a crosstalk component included in a voice signal of a main speaker, that is configured to update a parameter of the filter, and that is configured to store the updated parameter in a memory; a reset unit configured to reset the parameter of the filter in a case where it is determined that an analysis result of the speaker (Continued)

situation is switched; and a crosstalk suppression unit configured to suppress a crosstalk component by using a suppression signal.

5 Claims, 18 Drawing Sheets

(58) Field of Classification Search
USPC .................. 704/226, 227, 228; 381/71.4, 86
See application file for complete search history.

(56) References Cited

U.S. PATENT DOCUMENTS

| | | | | |
|---|---|---|---|---|
| 10,542,154 | B2* | 1/2020 | Suzuki | G10L 21/0208 |
| 11,089,404 | B2* | 8/2021 | Miyamoto | G10L 21/0208 |
| 2007/0021958 | A1* | 1/2007 | Visser | G10L 21/0272 |
| | | | | 704/226 |
| 2010/0002867 | A1* | 1/2010 | Bauer | H04B 3/23 |
| | | | | 379/406.08 |
| 2011/0211706 | A1 | 9/2011 | Tanaka et al. | |
| 2012/0099732 | A1 | 4/2012 | Visser | |
| 2013/0179163 | A1* | 7/2013 | Herbig | G10L 21/0208 |
| | | | | 381/86 |
| 2013/0294611 | A1* | 11/2013 | Yoo | G10L 21/028 |
| | | | | 381/66 |
| 2017/0193976 | A1* | 7/2017 | Mohammad | G10L 21/0208 |
| 2017/0249936 | A1* | 8/2017 | Hayashida | G10L 15/28 |
| 2018/0158467 | A1 | 6/2018 | Suzuki et al. | |
| 2018/0182410 | A1* | 6/2018 | Kaskari | G10L 25/18 |
| 2019/0228778 | A1* | 7/2019 | Lesso | G10L 17/04 |
| 2020/0015008 | A1* | 1/2020 | Xu | G10L 21/0232 |

FOREIGN PATENT DOCUMENTS

| | | | | |
|---|---|---|---|---|
| JP | 2006-047447 | | 2/2006 | |
| JP | 2006-173871 | | 6/2006 | |
| JP | 2009-216835 | A | 9/2009 | |
| JP | 2010-114554 | | 5/2010 | |
| JP | 2011-069901 | | 4/2011 | |
| JP | 2011-248025 | A | 12/2011 | |
| JP | 2013-543987 | | 12/2013 | |
| JP | 2015-014675 | A | 1/2015 | |
| WO | WO-2006028587 | A2 * | 3/2006 | ............. G10K 11/16 |
| WO | 2017/064840 | A1 | 4/2017 | |

* cited by examiner

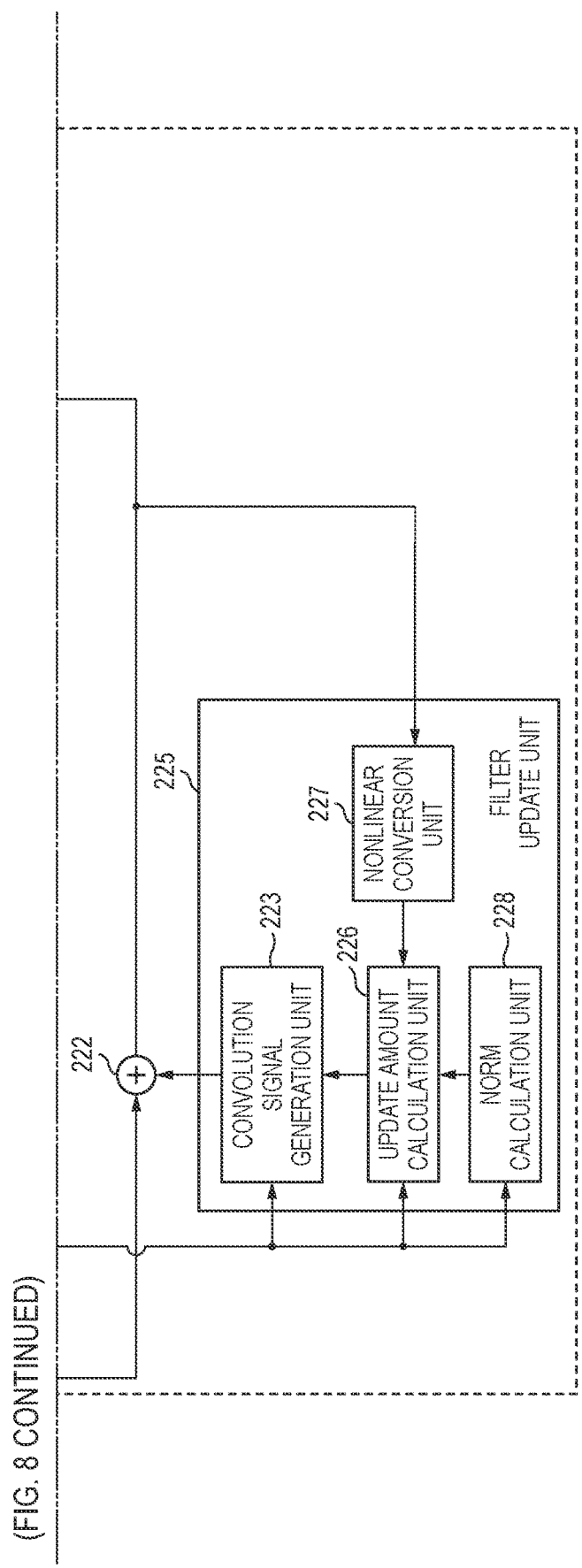

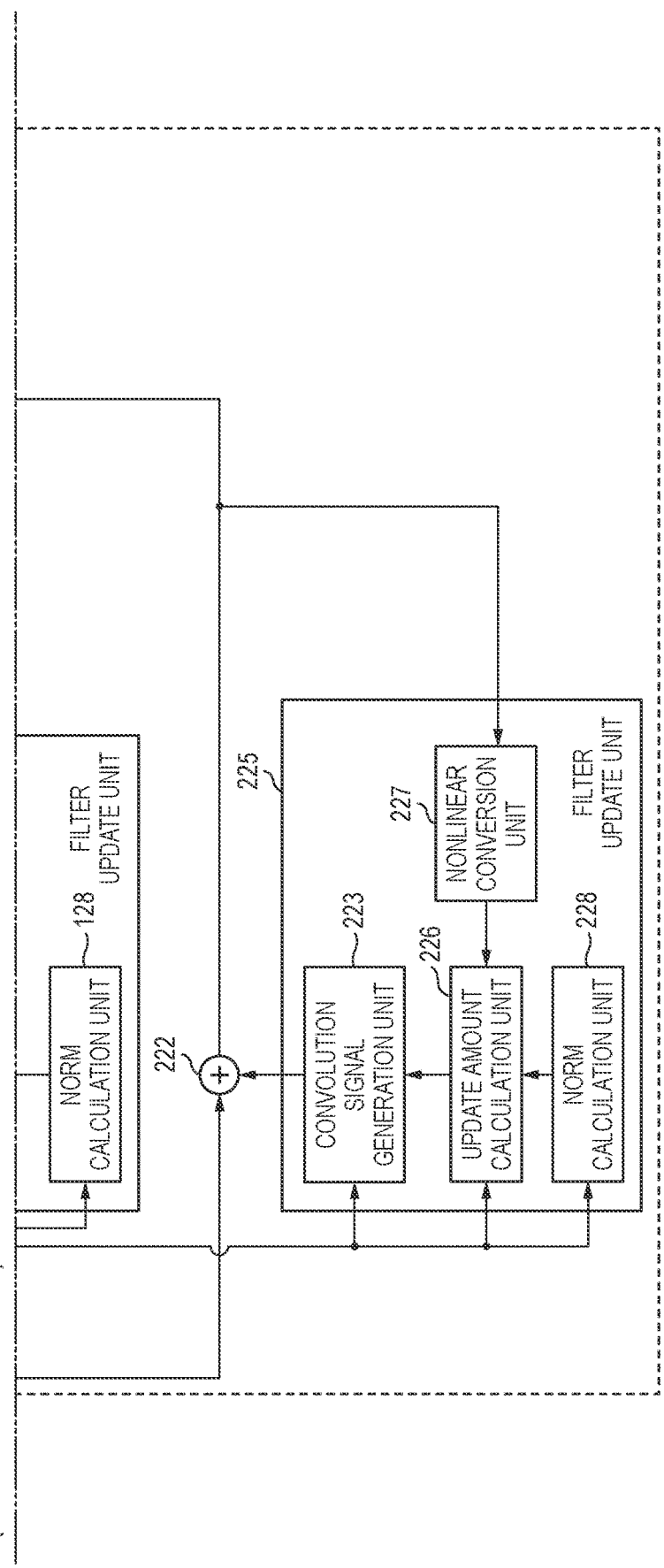
(FIG. 10 CONTINUED)

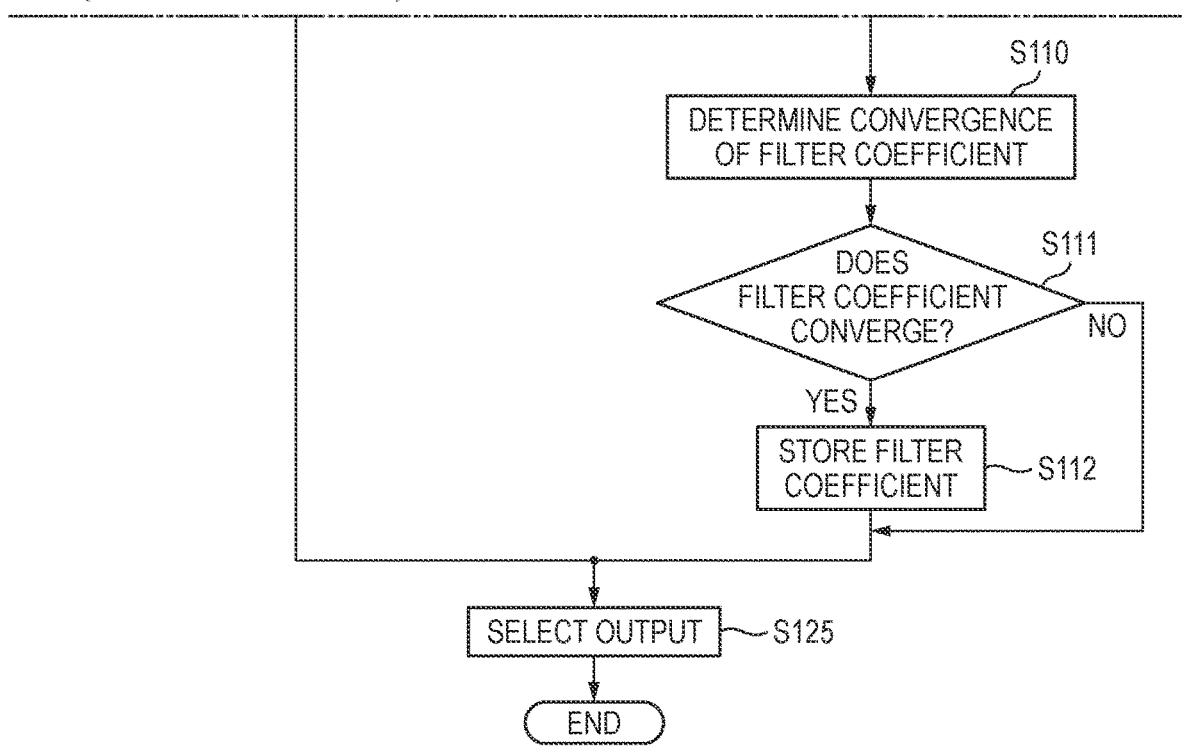

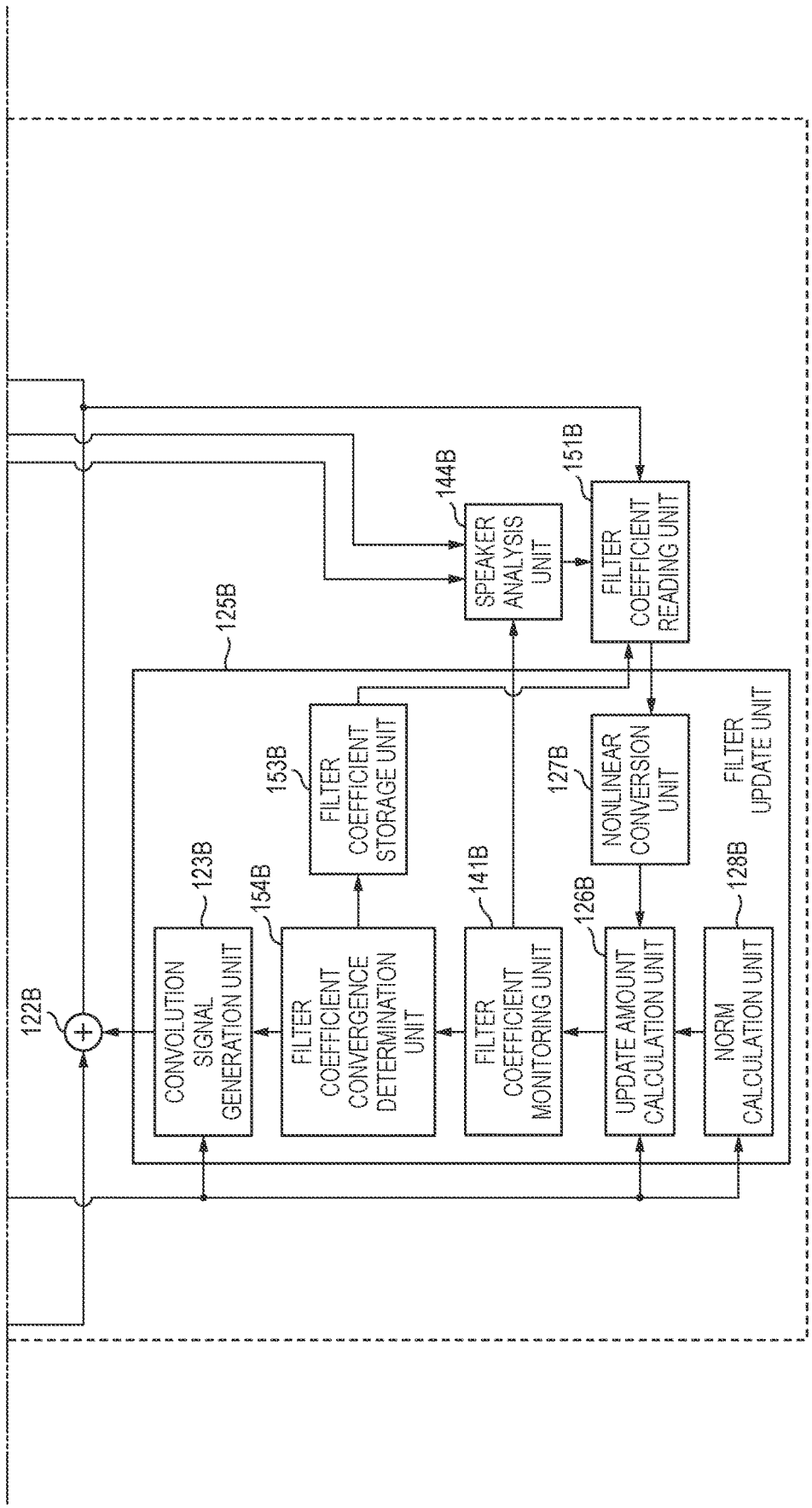

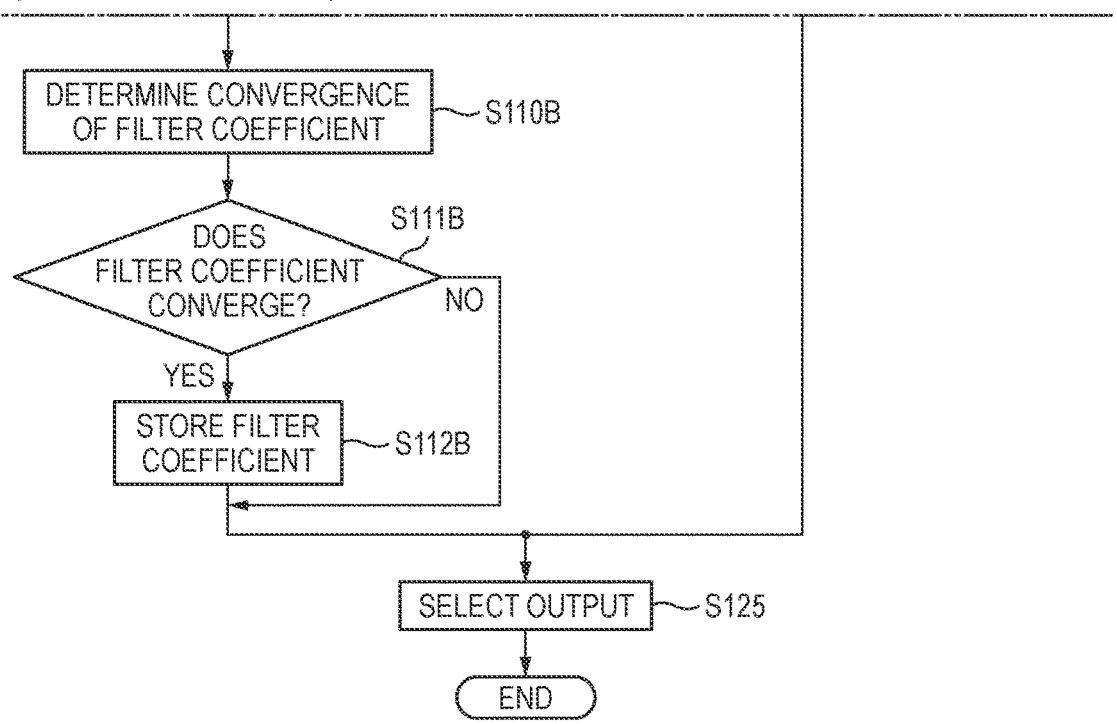

SOUND CROSSTALK SUPPRESSION DEVICE AND SOUND CROSSTALK SUPPRESSION METHOD

TECHNICAL FIELD

The present disclosure relates to a sound crosstalk suppression device and a sound crosstalk suppression method.

BACKGROUND ART

Patent Literature 1 discloses a sound removal device in which arrangement patterns of occupants are assumed in advance as a situation in a vehicle cabin, a sound transmission characteristic is measured for each arrangement pattern, and a sound included in a voice signal output from a speaker is estimated and removed by using each transmission characteristic obtained by the measurement and stored in a memory or the like. According to the sound removal device, it is possible to remove or suppress a sound as long as an arrangement of the occupants satisfies any one of the arrangement patterns.

CITATION LIST

Patent Literature

Patent Literature 1: JP-A-2009-216835

SUMMARY OF INVENTION

Technical Problem

In the configuration of Patent Literature 1, only one microphone for collecting an uttered voice of a driver is disposed in front of the driver, and, for example, no microphone for collecting voices of the occupants is disposed in front of another occupant. Since it is sufficiently considered that a plurality of occupants are present in the vehicle cabin, when not only the driver but also the other occupant utters with the driver at substantially the same time, the microphone of the driver also collects an uttered voice of the other occupant other than the driver. Therefore, in the configuration of Patent Literature 1, it is not possible to suppress a crosstalk component based on utterance of the other occupant and included in the voice signal collected by the microphone of the driver. This is because it is difficult for the microphone of the driver to collect a clear voice uttered by the other occupant, and a filter coefficient of an adaptive filter for suppressing the uttered voice of the other occupant as the crosstalk component cannot be learned.

The present disclosure has been devised in view of the above-described related-art circumstances, and an object thereof is to provide a sound crosstalk suppression device and a sound crosstalk suppression method that adaptively suppress a sound crosstalk component that may be included in an uttered voice of a main speaker and that improve sound quality of the uttered voice of the main speaker in accordance with a speaker situation of a plurality of occupants present in a closed space such as a vehicle cabin.

Solution to Problem

The present disclosure provides a sound crosstalk suppression device including: a speaker analysis unit configured to analyze a speaker situation in a closed space based on voice signals respectively collected by a plurality of microphones arranged in the closed space in which a plurality of persons including a main speaker are present; a filter update unit that includes a filter configured to generate a suppression signal of a crosstalk component caused by utterance of another speaker and included in a voice signal of the main speaker, that is configured to update a parameter of the filter for suppressing the crosstalk component, and that is configured to store an update result of the parameter of the filter in a memory; a reset unit configured to reset the parameter of the filter stored in the memory in a case where it is determined that an analysis result of the speaker situation is switched from an immediately preceding speaker situation; and a crosstalk suppression unit configured to suppress the crosstalk component included in the voice signal of the main speaker by using the suppression signal generated by the filter, in which the filter update unit updates the parameter of the filter based on the voice signal of the another speaker after the parameter of the filter is reset.

The present disclosure provides a sound crosstalk suppression device including: a speaker analysis unit configured to analyze a speaker situation in a closed space based on voice signals respectively collected by a plurality of microphones arranged in the closed space in which a plurality of persons including a main speaker are present; a filter update unit that includes a filter configured to generate a suppression signal of a crosstalk component caused by utterance of another speaker and included in a voice signal of the main speaker, that is configured to update a parameter of the filter for suppressing the crosstalk component, and that is configured to store an update result of the parameter of the filter in a memory in association with the speaker situation; and a crosstalk suppression unit configured to suppress the crosstalk component included in the voice signal of the main speaker by using the suppression signal generated by the filter, in which the filter update unit generates the suppression signal by the filter by using a parameter of the filter corresponding to an analysis result of the speaker situation in a case where it is determined that the analysis result of the speaker situation is switched from an immediately preceding speaker situation.

The present disclosure provides a sound crosstalk suppression method executed by a sound crosstalk suppression device, including: analyzing a speaker situation in a closed space based on voice signals respectively collected by a plurality of microphones arranged in the closed space in which a plurality of persons including a main speaker are present; updating a parameter of a filter that generates a suppression signal of a crosstalk component caused by utterance of another speaker and included in a voice signal of the main speaker, and storing an update result of the parameter of the filter in a memory; resetting the parameter of the filter stored in the memory in a case where it is determined that an analysis result of the speaker situation is switched from an immediately preceding speaker situation; and suppressing the crosstalk component included in the voice signal of the main speaker by using the suppression signal generated by the filter, in which the parameter is updated based on a voice signal of the another speaker after the parameter of the filter is reset.

The present disclosure provides a sound crosstalk suppression method executed by a sound crosstalk suppression device, including: analyzing a speaker situation in a closed space based on voice signals respectively collected by a plurality of microphones arranged in the closed space in which a plurality of persons including a main speaker are present; updating a parameter of a filter that generates a suppression signal of a crosstalk component caused by utterance of another speaker and included in a voice signal of the main speaker, and storing an update result of the parameter of the filter in a memory in association with the speaker situation; and suppressing the crosstalk component included in the voice signal of the main speaker by using the suppression signal generated by the filter, in which the generation of the suppression signal is executed using a parameter of the filter corresponding to an analysis result of the speaker situation in a case where it is determined that the analysis result of the speaker situation is switched from an immediately preceding speaker situation.

Advantageous Effects of Invention

According to the present disclosure, it is possible to adaptively suppress a sound crosstalk component that may be included in an uttered voice of a main speaker, and to improve sound quality of the uttered voice of the main speaker in accordance with a speaker situation of a plurality of occupants present in a closed space such as a vehicle cabin.

DESCRIPTION OF EMBODIMENTS

Hereinafter, embodiments specifically disclosing a sound crosstalk suppression device and a sound crosstalk suppression method according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding by those skilled in the art. The accompanying drawings and the following description are provided for a thorough understanding of the present disclosure for those skilled in the art, and are not intended to limit the subject matter in the claims.

First Embodiment

Figure 1:
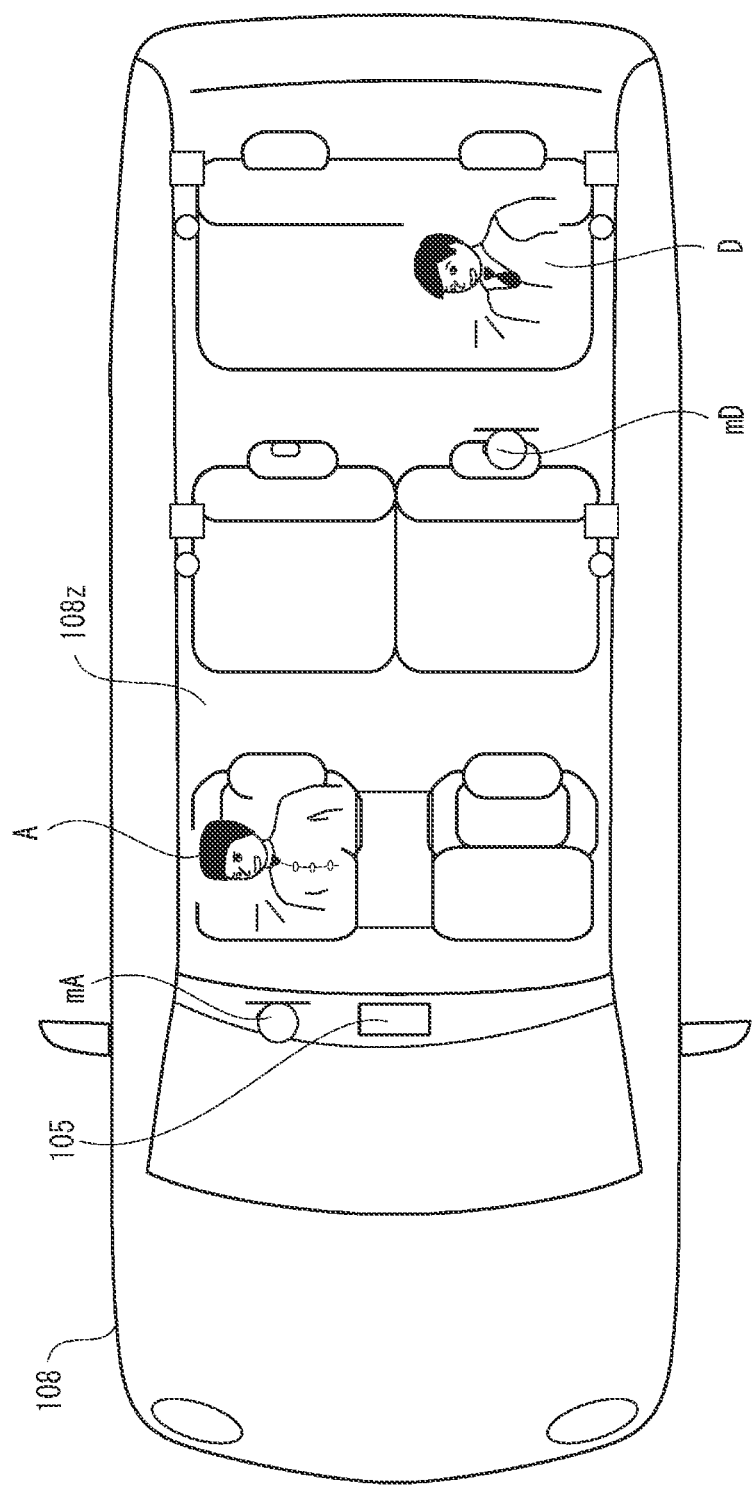
FIG. 1 is a diagram showing an arrangement example of occupants and microphones in a vehicle cabin of a vehicle on which a sound crosstalk suppression device according to a first embodiment is mounted.

FIG. 1 is a diagram showing an arrangement example of occupants and microphones in a vehicle cabin $108z$ of a vehicle 108 in which a sound crosstalk suppression device 105 according to a first embodiment is mounted. The vehicle 108 is a minivan of up to 7 to 8 people including, for example, a driver seat, a front passenger seat, a rear seat in a second row, and a rear seat in a third row in the vehicle cabin $108z$. It should be noted that the vehicle 108 is not limited to the minivan of up to 7 to 8 passengers, and for example, a passenger car or a bus of 5 passengers may be adopted, particularly, the number of passengers or a vehicle type is not limited.

In FIG. 1, a microphone mA is disposed in front of the driver seat on which an occupant A corresponding to a driver of the vehicle 108 is seated. A microphone mD is disposed in front of a left side of the rear seat in the third row on which an occupant D is seated. The number and the arrangement of the occupants and the number and the arrangement of the microphones can be optionally changed. For example, in FIG. 1, the number of microphones may be four by arranging the microphones in front of the front passenger seat and in front of a right side of the rear seat in the third row.

The microphone mA is a microphone for mainly collecting a voice uttered by the occupant A. The microphone mD is a microphone for mainly collecting a voice uttered by the occupant D. Although FIG. 1 shows an example in which no occupant is seated on the front passenger seat, the rear seat in the second row, and on the right side of the rear seat in the third row in order to facilitate understanding of the description, occupants may be seated on the respective seats.

The microphones mA and mD may be, for example, either directional microphones or non-directional microphones. Further, the microphones mA and mD each may be configured with, for example, a single body of a high-quality and small-sized electret condenser microphone (ECM), a microphone array configured with a plurality of ECMs, or the like. The microphones mA and mD are connected to the sound crosstalk suppression device 105, but wiring between the microphones mA and mD and the sound crosstalk suppression device 105 is not shown in order to avoid complication of FIG. 1.

The sound crosstalk suppression device 105 includes a housing that houses various electronic components, and is disposed, for example, inside a dashboard in the vehicle cabin $108z$ of the vehicle 108. The sound crosstalk suppression device 105 suppresses a voice (so-called crosstalk component) uttered by an occupant other than the occupant who is a voice recognition target among the voices collected by the microphone mA or the microphone mD. The voice uttered by the occupant who is not the voice recognition target becomes a crosstalk component included in the voice that is the voice recognition target with respect to the voice uttered by the occupant who is the voice recognition target. For example, when it is necessary to recognize the voice uttered by the occupant A, a crosstalk component included in a voice collected by the microphone mA for collecting the voice uttered by the occupant A is the voice uttered by the occupant D collected by the microphone mA.

(Configuration of Sound Crosstalk Suppression Device)

Figure 2:
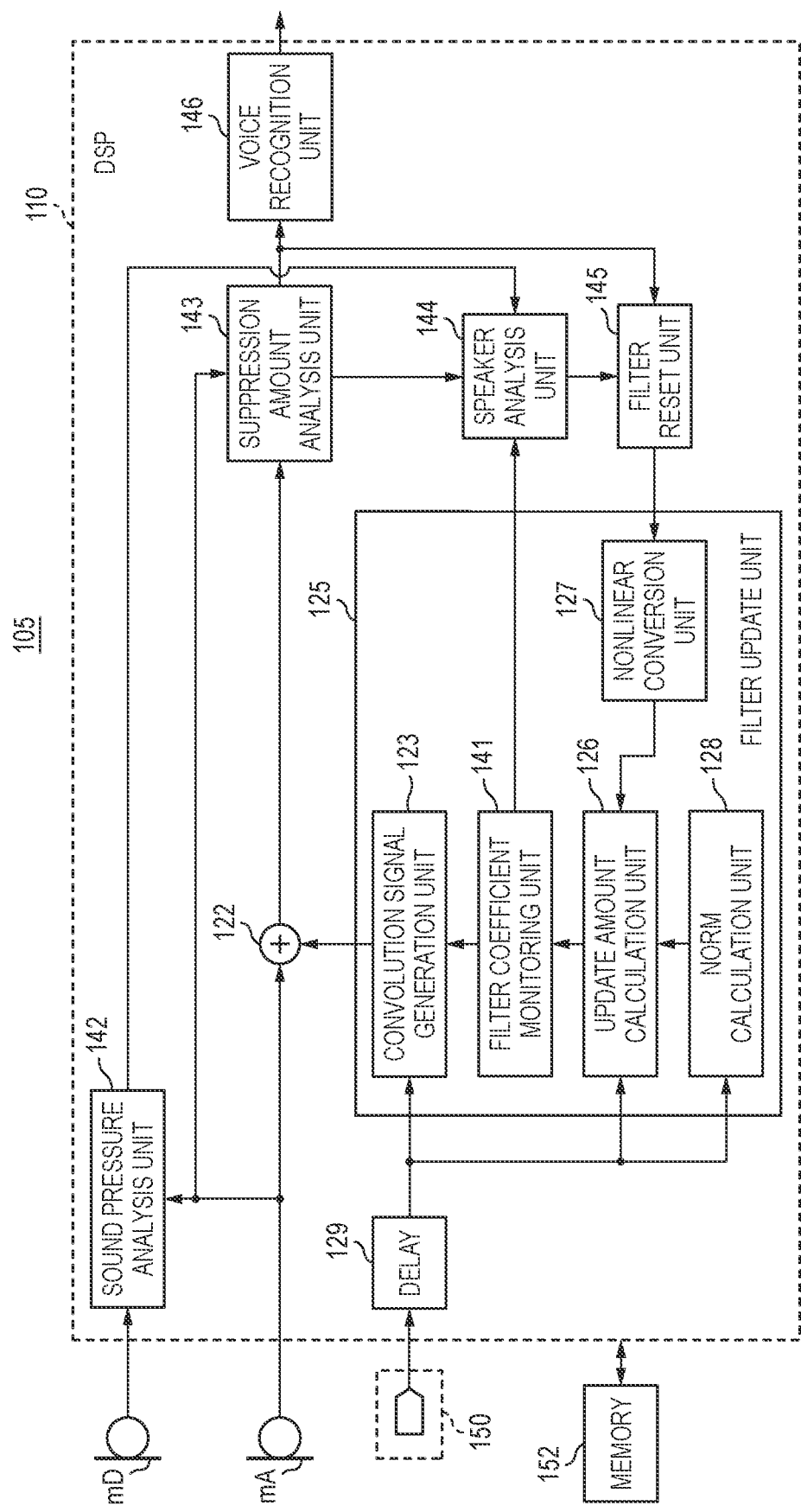
FIG. 2 is a block diagram showing a functional configuration example of the sound crosstalk suppression device according to the first embodiment.

FIG. 2 is a block diagram showing a functional configuration example of the sound crosstalk suppression device 105 according to the first embodiment. The sound crosstalk suppression device 105 generates a crosstalk suppression signal (an example of a suppression signal) in which a crosstalk component of the utterance of the occupant D collected by the microphone mA is reproduced by performing a convolution processing on a voice signal of the voice uttered by the occupant D collected by the microphone mD, which is included in a voice signal of the voice uttered by the occupant A who wants to perform voice recognition, which is collected by the microphone mA. The sound crosstalk suppression device 105 generates a voice signal after crosstalk suppression by suppressing (specifically, removing or subtracting) a crosstalk suppression signal of the occupant D from a voice signal collected by the microphone mA. Here, a voice signal generated by utterance of a main occupant that is the voice recognition target by the sound crosstalk suppression device 105 is referred to as a main signal, and an original voice signal from which a crosstalk suppression signal is generated (that is, a voice signal generated by utterance of another occupant other than the main occupant that is an utterance source of a crosstalk component) is referred to as a reference signal.

The sound crosstalk suppression device 105 is configured with, for example, a digital signal processor (DSP) 110 and memories 150 and 152 as a hardware configuration. The sound crosstalk suppression device 105 may include the microphones mA and mD in addition to the DSP 110 and the memories 150 and 152. Further, although the sound crosstalk suppression device 105 for the microphone mA is exemplified here, the same applies to the sound crosstalk suppression device 105 for the microphone mD. That is, the description will be given by exemplifying a voice signal of the main occupant A collected by the microphone mA as the main signal and a voice signal of the sub-occupant D collected by the microphone mD as the reference signal, but conversely, the voice signal of the main occupant D collected by the microphone mD may be the main signal and the voice signal of the sub-occupant A collected by the microphone mA may be the reference signal.

The memory 150 includes a random access memory (RAM) as a work memory of the sound crosstalk suppression device 105, and a read only memory (ROM) that stores a program related to a processing of the sound crosstalk suppression device 105. The memory 150 stores, as a reference signal, for example, a voice signal of a voice of utterance of the sub-occupant D collected by the microphone mD. Further, the memory 152 stores a voice recognition result (including, for example, voice recognition data and a score value) of a voice recognition unit 146 and a filter coefficient updated by a filter update unit 125. The voice recognition data is, for example, text data in which a content of a voice uttered by the main occupant A (an example of a main speaker) is converted into text. The score value is an evaluation value indicating reliability (accuracy) of text data that is a processing result of voice recognition performed by the voice recognition unit 146.

The DSP 110 is, for example, a processor that performs a processing of suppressing the crosstalk component of the voice of the utterance of the sub-occupant D from the voice signal of the voice of the utterance of the main occupant A collected by the microphone mA. Further, the DSP 110 performs a voice recognition processing on the voice signal after the crosstalk suppression. Here, the DSP is used as the processor, but for example, a central processing unit (CPU), a graphical processing unit (GPU), or the like may be used. Further, a dedicated electronic circuit designed by an application specific integrated circuit (ASIC) or the like, or an electronic circuit designed to be reconfigurable, such as a field programmable gate array (FPGA), may be used.

The DSP 110 includes an adder 122, the filter update unit 125, a delay 129, a sound pressure analysis unit 142, a suppression amount analysis unit 143, a speaker analysis unit 144, a filter reset unit 145, and the voice recognition unit 146.

The adder 122 as an example of a crosstalk suppression unit subtracts a crosstalk suppression signal generated by the filter update unit 125 from the voice signal of the voice of the utterance of the main occupant A collected by the microphone mA, thereby suppressing the crosstalk component included in the voice of the utterance of the main occupant A collected by the microphone mA. As described above, the processing performed by the adder 122 is strictly subtraction, but even the processing of subtracting the crosstalk suppression signal can be considered to be substantially equivalent to a processing of inverting the crosstalk suppression signal and then adding the inverted crosstalk suppression signal in the adder 122. Therefore, in the present specification, the suppression processing of the crosstalk component is described as the processing performed by the adder 122.

The processing of the filter update unit 125 will be described in detail. The crosstalk component suppressed by the sound crosstalk suppression device 105 is, for example, a voice in which a voice uttered by another occupant D reaches the microphone mA disposed in front of the occupant A when the main speaker that is the voice recognition target is the occupant A. The voice reaches the microphone mA via a transmission path in the vehicle cabin 108z. Therefore, the voice collected by the microphone mA is a voice mixed with the voice uttered by the occupant A with a time lag (so-called delay time) required for the voice uttered by the occupant D to pass through the transmission path.

The filter update unit 125 generates a crosstalk suppression signal for suppressing (subtracting) a crosstalk component included in the voice collected by the microphone mA based on the voice signal after the crosstalk suppression collected by the microphone mA and the reference signal collected by the microphone mD and shifted by the delay time. The filter update unit 125 includes a convolution signal generation unit 123, a filter coefficient monitoring unit 141, an update amount calculation unit 126, a nonlinear conversion unit 127, and a norm calculation unit 128.

The convolution signal generation unit 123 as an example of a filter is configured with, for example, an adaptive filter, and performs the convolution processing on the reference signal by using a filter coefficient (an example of a parameter) calculated by the update amount calculation unit 126, and performs the processing of generating the crosstalk suppression signal by using the reference signal. As the adaptive filter, for example, a finite impulse response (FIR)

filter described in Patent Literature 1, JP-A-2007-19595, or the like is used. The adaptive filter reproduces transmission characteristics between the microphone mA and the microphone mD, and generates a crosstalk suppression signal by processing the reference signal. However, since the transmission characteristics in the vehicle cabin 108z are not steady, characteristics of the adaptive filter also need to be changed at any time. In the first embodiment, the characteristics of the adaptive filter are changed so as to approach latest transmission characteristics between the microphone mA and the microphone mD by controlling a coefficient or the number of taps of the adaptive filter. Hereinafter, an update of the adaptive filter may be referred to as learning.

The voice of the sub-occupant D collected by the microphone mA is delayed with respect to the voice of the sub-occupant D collected by the microphone mD by time during which the voice is transmitted from the microphone mD to the microphone mA. Since the reference signal is collected by the microphone mD and stored in the memory 150, the delay time from the microphone mD to the microphone mA is not reflected. Therefore, in the first embodiment, the delay 129 as a delay device absorbs the time difference. That is, the delay 129 performs a delay processing on the reference signal by the time difference described above (in short, the time required for the transmission path of the voice from the microphone mD to the microphone mA), and outputs the reference signal to the filter update unit 125. Accordingly, the filter update unit 125 can obtain the reference signal that matches a timing at which the voice is collected by the microphone mA. A value of the delay 129 can be obtained by approximately measuring a distance between the microphone mD and the microphone mA and dividing the distance by a sound velocity. For example, when the sound velocity based on a temperature in the vehicle cabin 108z is 340 m/s and the distance between the microphone mD and the microphone mA is about 3.4 m, the value of the delay 129 is about 10 msec.

More precisely, the value of the delay (delay time) is different for each reference signal, and is obtained as follows. For example, it is assumed that the microphone mA is disposed in front of the occupant A and the microphone mD is disposed in front of the occupant D in the vehicle cabin 108z. In a case where the occupant D utters and the voice of the occupant D included in the microphone mA is suppressed, when the voice collected by the microphone mD is used as the reference signal, the value of the delay is calculated based on a difference between a distance from a mouth of the occupant D to the microphone mD and a distance from the mouth of the occupant D to the microphone mA. In contrast, in a case where the occupant A utters and the voice of the occupant A included in the microphone mD is suppressed, when the voice collected by the microphone mA is used as the reference signal, the value of the delay is calculated based on a difference between a distance from a mouth of the occupant A to the microphone mA and a distance from the mouth of the occupant A to the microphone mD.

The nonlinear conversion unit 127 performs nonlinear conversion on a voice signal after the suppression of the crosstalk component. The nonlinear conversion is a processing of converting the voice signal after the suppression of the crosstalk component into information indicating a direction (positive or negative) in which the adaptive filter is to be updated. The nonlinear conversion unit 127 outputs the signal after the nonlinear conversion to the update amount calculation unit 126.

The norm calculation unit 128 calculates a norm of the voice signal of the voice collected by the microphone mD. The norm of the voice signal is a sum of magnitudes of voice signals within a predetermined time in the past, and is a value indicating a degree of a magnitude of a signal within this time. The update amount calculation unit 126 uses the norm in order to normalize an influence of a sound volume of a voice collected by the microphone mD in the past. Generally, since an update amount of the adaptive filter may be calculated to be larger as the sound volume is larger, the characteristics of the adaptive filter may be excessively influenced by characteristics of a large voice without performing the normalization. In the first embodiment, the update amount of the adaptive filter is stabilized by normalizing the voice signal output from the delay 129 by using the norm calculated by the norm calculation unit 128.

The update amount calculation unit 126 calculates the update amount of the adaptive filter characteristics of the convolution signal generation unit 123 (specifically, the update amount of the coefficient or the number of taps of the adaptive filter) by using signals received from the nonlinear conversion unit 127, the norm calculation unit 128, and the delay 129. The update amount calculation unit 126 normalizes the voice signal of the voice collected by the microphone mD via the delay 129 based on the norm calculated by the norm calculation unit 128. The update amount calculation unit 126 determines an update amount by adding positive or negative information based on information obtained from the nonlinear conversion unit 127 to a result of normalizing the voice signal of the voice collected by the microphone mD. In the first embodiment, the update amount calculation unit 126 calculates the update amount of the filter characteristics by an independent component analysis (ICA) algorithm. Here, a case where the update amount calculation unit 126 updates the coefficient of the adaptive filter (hereinafter, referred to as filter coefficient) is shown, but the number of taps may be updated instead of the filter coefficient or together with the filter coefficient.

The filter update unit 125 brings characteristics of the convolution signal generation unit 123 close to the transmission characteristics between the microphone mD and the microphone mA by executing the processings of the update amount calculation unit 126, the nonlinear conversion unit 127, and the norm calculation unit 128 at any time.

The filter coefficient monitoring unit 141 monitors the filter coefficient (for example, a variation width of the filter coefficient) of the convolution signal generation unit 123 calculated by the update amount calculation unit 126, and outputs the filter coefficient to the speaker analysis unit 144. The speaker analysis unit 144 monitors a change amount of the filter coefficient, for example, a variation width of the filter coefficient in a certain period of time on a time axis, and determines that switching of speakers has occurred in a case where the change amount exceeds a first threshold corresponding to a value of a change amount when the speaker is switched.

The sound pressure analysis unit 142 inputs the voice collected by the microphone mA and the voice collected by the microphone mD, and outputs sound pressures of the voices to the speaker analysis unit 144. The speaker analysis unit 144 determines that the switching of the speakers has occurred when the speaker has changed by exceeding a second threshold corresponding to a value of a change amount when a speaker of at least one of the sound pressure of the voice collected by the microphone mA and the sound pressure of the voice collected by the microphone mD is switched.

The suppression amount analysis unit 143 calculates a difference between the voice signal after the suppression of the crosstalk component output from the adder 122 and the voice signal of the voice collected by the microphone mA as a suppression amount, and outputs the calculated difference to the speaker analysis unit 144. The speaker analysis unit 144 stores data of the suppression amount for a predetermined period, and determines that the switching of the speakers has occurred when the newly calculated suppression amount has changed from a suppression amount for the past by exceeding a third threshold indicating that a speaker situation is switched. The determination is based on a fact that, when the speaker is switched, a suppression amount of crosstalk decreases with a filter coefficient used immediately before that moment.

The speaker analysis unit 144 determines the switching of the speakers, that is, the change in the speaker situation, based on at least one of inputs from the filter coefficient monitoring unit 141, the sound pressure analysis unit 142, and the suppression amount analysis unit 143, and outputs a determination result thereof to the filter reset unit 145.

Here, the number of speaker situations (scenes) is 4($=2^2$) when the number of microphones arranged in the vehicle cabin 108z is two. The number of speaker situations of another occupant is 2 ($=2^1$) when the occupant D utters and when the occupant D does not utter, only in a scene where the occupant A who is the voice recognition target utters.

A captured image by a camera (not shown) in the vehicle cabin 108z that captures an image of an occupant may be input to the speaker analysis unit 144. The speaker analysis unit 144 may perform face recognition for the captured image, identify, for example, an occupant who opens a mouth as a speaker, and determine that switching of the speakers has occurred. Further, the speaker analysis unit 144 may comprehensively determine that the switching of the speakers has occurred by combining the speaker-switching information based on the captured image with at least one or more pieces of speaker-switching information input from the filter coefficient monitoring unit 141, the sound pressure analysis unit 142, and the suppression amount analysis unit 143. Further, when the speaker-switching information based on the captured image is used, all or at least one of the filter coefficient monitoring unit 141, the sound pressure analysis unit 142, and the suppression amount analysis unit 143 may be omitted.

The filter reset unit 145 as an example of a reset unit resets the filter coefficient of the convolution signal generation unit 123 to an initial value (for example, a value of 0) when a determination result of the switching of the speakers is input from the speaker analysis unit 144. After the filter reset unit 145 resets the filter coefficient, the filter update unit 125 resumes learning of the convolution signal generation unit 123 reset to the initial value.

The voice recognition unit 146 performs voice recognition based on the voice signal after the suppression of the crosstalk component output from the adder 122, outputs voice recognition data (for example, text data) and an evaluation value (score value) as a voice recognition result, and stores the voice recognition data and the evaluation value in the memory 152. For example, when the voice recognition unit 146 is connected to a monitor (not shown, for example, a display of a car navigation device mounted on the vehicle 108), the voice recognition result is displayed on a screen as text. Further, when the voice recognition unit 146 is connected to a communication device, the voice recognition result is transmitted as communication data. Further, when the voice recognition unit 146 is connected to a speaker, the voice recognition result is output as voice.

Instead of including the voice recognition unit 146, the sound crosstalk suppression device 105 may include a communication unit connectable to a network, transmit voice data based on the voice signal after the suppression of the crosstalk component to a cloud server (not shown) via the network, perform voice recognition by the cloud server, receive a voice recognition result from the cloud server, and output the voice recognition result to a monitor, a speaker, or the like.

Figure 3A:
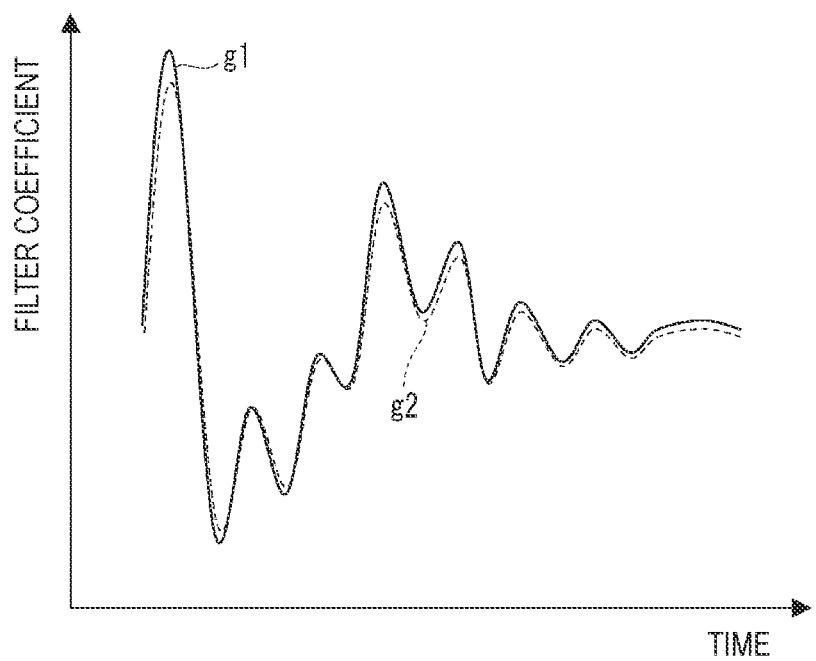
FIG. 3A is a graph showing an example of a time change in a filter coefficient when a change amount is small.
Figure 3B:
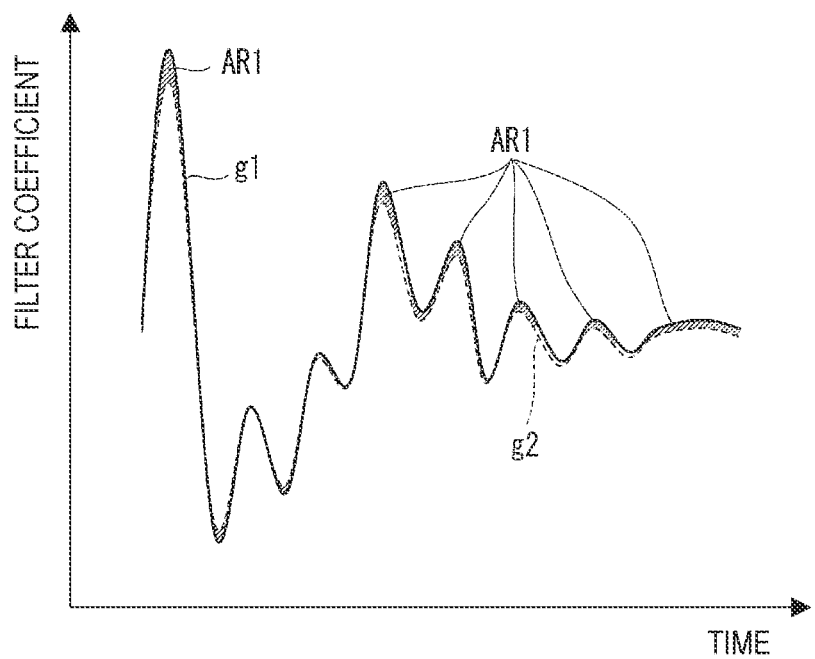
FIG. 3B is a graph showing an example of a time change in the filter coefficient when the change amount is small.

FIGS. 3A and 3B are graphs showing examples of a time change in the filter coefficient when a change amount AR1 is small. A vertical axis of the graph represents the filter coefficient, and a horizontal axis represents time (in other words, a tap length of the adaptive filter that constitutes the convolution signal generation unit 123). The filter coefficient of the convolution signal generation unit 123 calculated by the update amount calculation unit 126 is monitored by the filter coefficient monitoring unit 141. For example, when the voice signal of the occupant A collected by the microphone mA is the main signal, the voice of the occupant D collected by the microphone mA becomes the crosstalk component of the voice collected by the microphone mA. A characteristic g2 shown in FIGS. 3A and 3B represents a filter coefficient at a time point (t–Δt) for subtracting the voice of the occupant D collected by the microphone mA based on the voice of the occupant D collected by the microphone mD as the crosstalk component of the voice collected by the microphone mA. A characteristic g1 shown in FIGS. 3A and 3B represents a filter coefficient at a time point t for subtracting the voice of the occupant D collected by the microphone mA based on the voice of the occupant D collected by the microphone mD as the crosstalk component of the voice collected by the microphone mA. That is, in FIGS. 3A and 3B, the characteristics g1 and g2 are both shown such that values of time axes coincide with each other as waveforms of filter coefficients in a period (in other words, a reverberation time) from a time point at which update of the filter coefficients is started to a time point at which the update of the filter coefficients converges. Δt is a certain period of time as a set value, and indicates, for example, a time required for updating the filter coefficient of the adaptive filter at least one time, and the same applies to the following description.

In FIG. 3B, during a period from a time point (t–Δt) to a time point t, the change amount AR1 of the filter coefficient is smaller than the first threshold when the speaker is switched. Since the change amount AR1 of the filter coefficient is smaller than the first threshold, the speaker analysis unit 144 can determine that the speaker is not switched, that is, the occupant D does not utter, and the speaker situation is not changed.

Figure 4A:
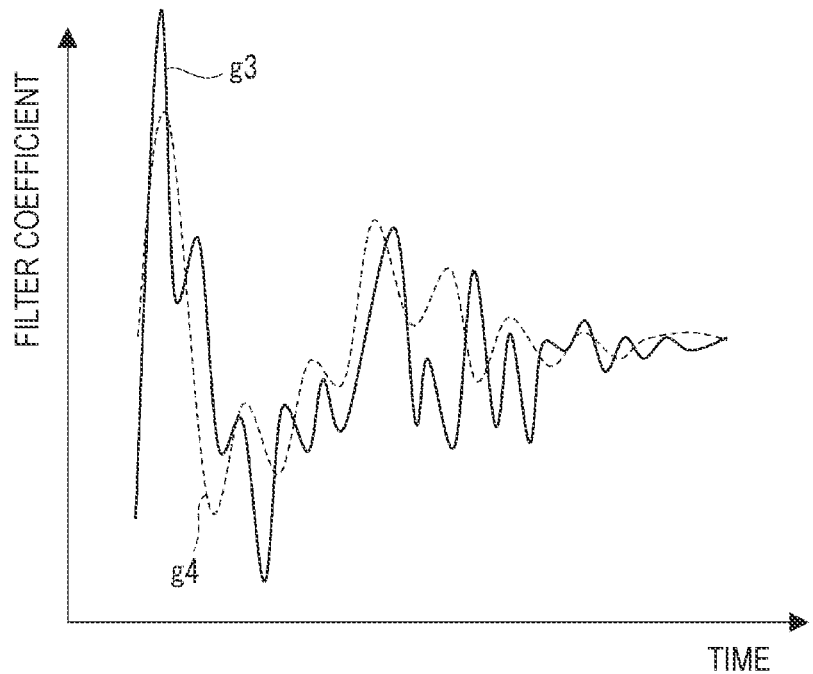
FIG. 4A is a graph showing an example of a time change in the filter coefficient when the change amount is large.
Figure 4B:
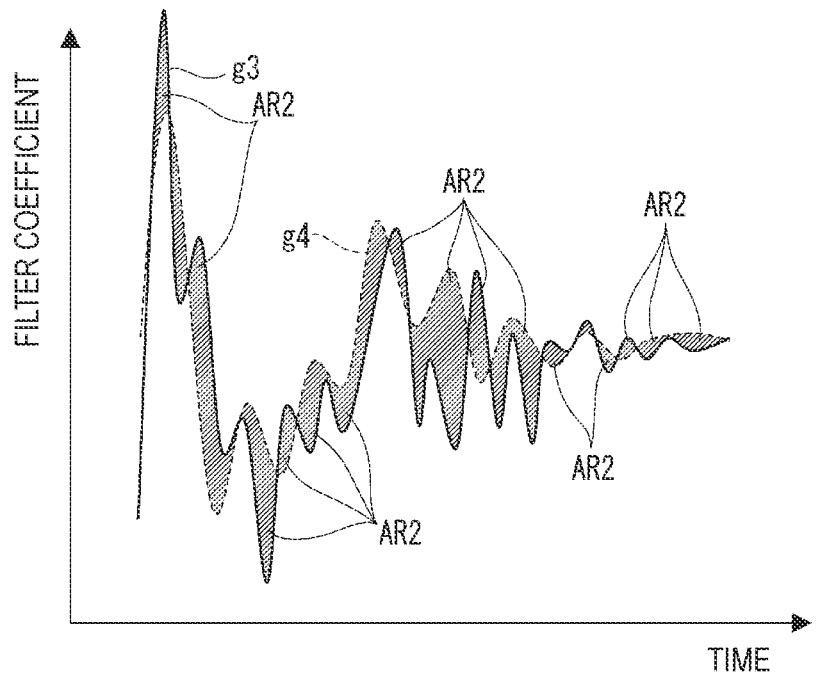
FIG. 4B is a graph showing an example of a time change in the filter coefficient when the change amount is large.

FIGS. 4A and 4B are graphs showing examples of a time change in the filter coefficient when a change amount AR2 is large. A vertical axis of the graph represents the filter coefficient, and a horizontal axis represents time (in other words, a tap length of the adaptive filter that constitutes the convolution signal generation unit 123). A characteristic g4 shown in FIGS. 4A and 4B represents a filter coefficient at a time point (t–Δt) for subtracting the voice of the occupant D collected by the microphone mA based on the voice of the occupant D collected by the microphone mD as the crosstalk component of the voice collected by the microphone mA. A characteristic g3 shown in FIGS. 4A and 4B represents a filter coefficient at a time point t for subtracting the voice of the occupant D collected by the microphone mA based on the voice of the occupant D collected by the microphone mD as the crosstalk component of the voice collected by the microphone mA. That is, in FIGS. 4A and 4B, the characteristics g3 and g4 are both shown such that values of time axes coincide with each other as waveforms of filter coefficients in a period (in other words, a reverberation time) from a time point at which update of the filter coefficients is started to a time point at which the update of the filter coefficients converges.

In FIG. 4B, the change amount AR2 of the filter coefficient between the characteristics g3 and g4 during a period from the time point (t−Δt) to the time point t is larger than the change amount AR1 of the filter coefficient between the characteristics g1 and g2 during the period from the time point (t−Δt) to the time point t shown in FIG. 3B by exceeding the first threshold. Since the change amount AR2 of the filter coefficient is larger than the first threshold, the speaker analysis unit 144 can determine that the change amount of the filter coefficient for subtracting the voice of the occupant D, which is the crosstalk component of the voice collected by the microphone mA, is increased due to the switching of the speakers, that is, the utterance of the occupant D. Therefore, the speaker analysis unit 144 can determine that the speaker situation is changed.

(Operation of Sound Crosstalk Suppression Device)

Next, an operation of the sound crosstalk suppression device 105 according to the first embodiment will be described.

Here, as described above, a case where the voice uttered by the occupant A, which is the main speaker, collected by the microphone mA is set as the voice recognition target and the voice uttered by the sub-occupant D, which is collected by the microphone mA, is set as the crosstalk component will be described as an example. The voice uttered by the occupant D and collected by the microphone mD may be the voice recognition target, and the voice uttered by the occupant A and collected by the microphone mD may be the crosstalk. Further, a button for instructing which uttered voice of the occupant is a voice recognition target may be disposed in the vehicle 108, and in addition, for example, in a dedicated application installed in a smartphone, a tablet terminal, or the like possessed by the occupant, an operation for instructing the occupant of the voice recognition target may be performed to designate the occupant of the voice recognition target.

Figure 5:
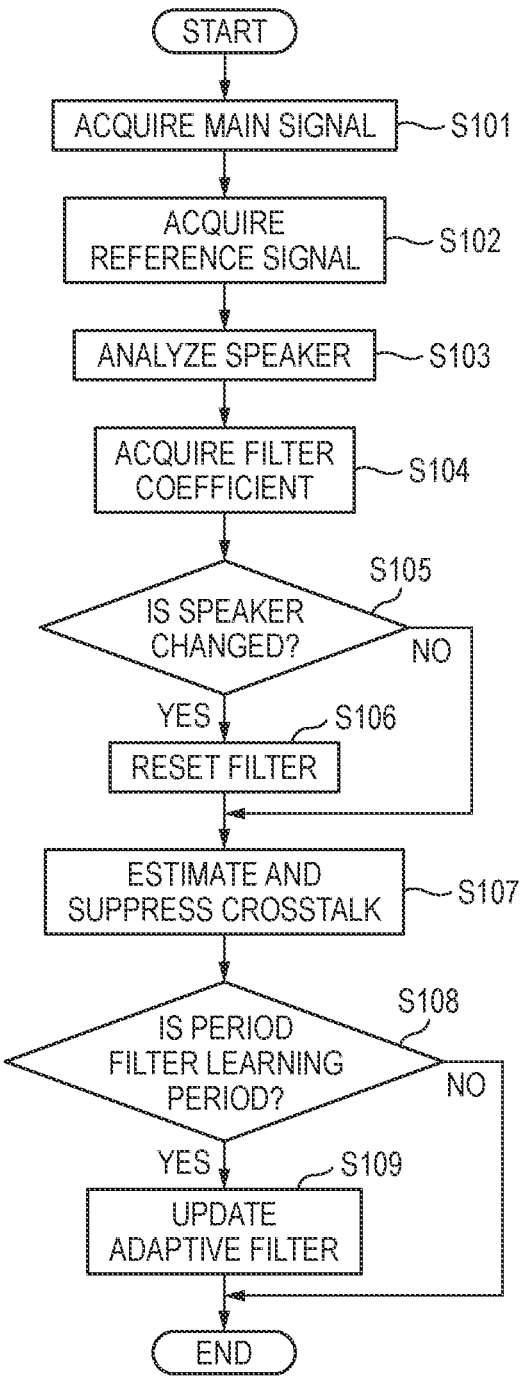
FIG. 5 is a flowchart showing an example of an operation procedure of the sound crosstalk suppression device according to the first embodiment.

FIG. 5 is a flowchart showing an example of an operation procedure of the sound crosstalk suppression device 105 according to the first embodiment. The processing of FIG. 5 is executed by the DSP 110 that constitutes the sound crosstalk suppression device 105, and is repeatedly executed for each sample of a voice signal of a voice collected by the microphone mA and input to the sound crosstalk suppression device 105.

In FIG. 5, the DSP 110 acquires the voice signal of the voice uttered by the main occupant A and collected by the microphone mA as a main signal for which the voice recognition is desired (S101). The sound pressure analysis unit 142 inputs the main signal of the microphone mA and outputs a sound pressure level of the main signal to the speaker analysis unit 144.

The DSP 110 acquires, as a reference signal, the voice signal of the voice uttered by the sub-occupant D and collected by the microphone mD (S102). The DSP 110 stores data of the voice collected by the microphone mD in the memory 150. Further, the sound pressure analysis unit 142 inputs the reference signal of the microphone mD and outputs a sound pressure level of the reference signal to the speaker analysis unit 144.

The speaker analysis unit 144 compares the sound pressure level of the main signal with the second threshold (see the above description), and compares the sound pressure level of the reference signal with the second threshold (see the above description) to analyze a speaker situation (S103).

The filter coefficient monitoring unit 141 acquires a filter coefficient of the convolution signal generation unit 123 calculated by the update amount calculation unit 126 (S104).

The speaker analysis unit 144 determines whether the speaker is switched based on the speaker situation analyzed in step S103 and the filter coefficient acquired in step S104 (S105). When the speaker is switched (S105, YES), the filter reset unit 145 resets the filter coefficient of the convolution signal generation unit 123 to an initial value (S106). In contrast, when the speaker situation is not switched in S105 (S105, NO), the DSP 110 directly proceeds to the processing of step S107.

The convolution signal generation unit 123 performs a convolution processing by using a reference signal on which a delay processing corresponding to delay time is performed by the delay 129 by using the filter coefficient calculated by the update amount calculation unit 126, and generates a crosstalk suppression signal (S107). The adder 122 subtracts the crosstalk suppression signal generated by the convolution signal generation unit 123 from the voice signal of the voice uttered by the main occupant A and collected by the microphone mA, and suppresses a crosstalk component included in the voice uttered by the main occupant A and collected by the microphone mA.

Subsequently, the sound crosstalk suppression device 105 determines whether it is a filter learning period (S108). The filter learning period is, for example, a period during which someone other than the occupant A who is the main speaker utters in order to learn a filter coefficient for suppressing the crosstalk component included in the voice of the occupant A who is the main speaker. Further, a period that is not the filter learning period is a period during which no occupant other than the occupant A utters. When a period is the filter learning period (S108, YES), the filter update unit 125 updates the filter coefficient of the convolution signal generation unit 123 with the filter coefficient calculated by the update amount calculation unit 126, and stores an update result thereof in the memory 152 (S109). In contrast, when a period is not the filter learning period (S108, NO), the sound crosstalk suppression device 105 directly ends the processing of FIG. 5.

When it is determined that the speaker is switched in an environment in the vehicle 108, the sound crosstalk suppression device 105 according to the first embodiment resets the filter coefficient to an initial value (for example, a value of 0) at that timing, and relearns and uses the filter coefficient. Accordingly, it is possible to relearn the filter coefficient in accordance with the new speaker situation, to suppress the crosstalk component in accordance with the speaker situation with high accuracy, and to improve sound quality of the voice uttered by the main speaker (for example, the occupant A). Further, depending on the environment in the vehicle 108 and the speaker situation, it can be expected that time until the filter coefficient after the switching of the speakers converges is shorter than that in a case where the filter coefficient learned before the switching of the speakers is continuously used while being learned even after the switching of the speakers. Therefore, the sound crosstalk suppression device 105 can adaptively suppress the crosstalk component generated by the utterance of the other occupant (for example, the occupant D) and included in the uttered voice of the main speaker (for example, the occupant A), and can improve sound quality of the output voice of the occupant A who is the voice recognition target.

In this way, the sound crosstalk suppression device 105 analyzes, by the speaker analysis unit 144, the speaker situation in the vehicle cabin 108z based on the respective voice signals collected by the two microphones mA and mD arranged in the vehicle cabin 108z (in a closed space) in which a plurality of occupants (a plurality of persons) including the occupant A who is the main speaker are present. The sound crosstalk suppression device 105 includes the convolution signal generation unit 123 that generates a suppression signal of the crosstalk component (that is, the crosstalk suppression signal) caused by the utterance of the other occupant D and included in the voice signal of the occupant A who is the main speaker, updates the filter coefficient of the convolution signal generation unit 123 for suppressing the crosstalk component, and stores an update result thereof in the memory 152 by the filter update unit 125. When it is determined that the analysis result of the speaker situation is switched from an immediately preceding speaker situation, the sound crosstalk suppression device 105 resets the filter coefficient stored in the memory 152 by the filter reset unit 145. The sound crosstalk suppression device 105 suppresses, by the adder 122, the crosstalk component included in the voice signal of the occupant A by using the suppression signal of the crosstalk component generated by the convolution signal generation unit 123. After the filter coefficient of the convolution signal generation unit 123 is reset, the filter update unit 125 updates the filter coefficient based on the voice signal of the occupant D.

Accordingly, the sound crosstalk suppression device 105 can adaptively suppress the sound crosstalk component that may be included in the uttered voice of the occupant A who is the main speaker, in accordance with the speaker situation of the plurality of occupants (for example, the occupants A and D) in the vehicle cabin 108z, and can improve the sound quality of the uttered voice of the occupant A. Further, as compared with a case where the filter coefficient is continuously used without being reset, it can be expected that convergence of the filter coefficient by the update is accelerated by resetting the filter coefficient every time it is determined that the speaker situation is switched.

When it is determined that the analysis result of the speaker situation is not switched from the immediately preceding speaker situation, the convolution signal generation unit 123 generates the suppression signal of the crosstalk component by using a latest filter coefficient stored in the memory 150. Accordingly, when the same speaker situation continues, the sound crosstalk suppression device 105 can continuously obtain an adaptive crosstalk component already calculated in accordance with the speaker situation, and therefore can effectively suppress the crosstalk component included in the uttered voice of the main speaker.

The speaker analysis unit 144 analyzes whether there is a change in the speaker situation in the vehicle cabin 108z (in the closed space) in accordance with a comparison between sound pressure levels of the voice signals collected by the two microphones mA and mD with the second threshold (an example of a threshold). Accordingly, the sound crosstalk suppression device 105 can estimate the main speaker with high accuracy in addition to whether the speaker situation is switched in accordance with magnitudes of voice signals collected by the microphones mA and mD in consideration of arrangement positions of the microphones mA and mD and positions of the occupants in the vehicle 108.

The speaker analysis unit 144 analyzes whether there is a change in the speaker situation in the vehicle cabin 108z based on a variation amount on the time axis of the filter coefficient of the convolution signal generation unit 123. Accordingly, when the filter coefficient fairly changes due to new utterance (in other words, utterance of the main speaker under a switched new speaker situation) (for example, when a variation width of the filter coefficient in a certain period of time on the time axis exceeds the first threshold), the sound crosstalk suppression device 105 can determine with high accuracy that the switching of the speakers has occurred.

The speaker analysis unit 144 analyzes whether there is a change in the speaker situation in the vehicle cabin 108z in accordance with a comparison between a suppression amount of the crosstalk component included in the voice signal of the occupant A with the third threshold (an example of the threshold). Accordingly, the sound crosstalk suppression device 105 can determine with high accuracy that the switching of the speakers has occurred, assuming that the suppression amount of the crosstalk component has decreased due to the new utterance (in other words, the utterance of the main speaker under the switched new speaker situation) (in other words, the crosstalk suppression signal up to now is not effective).

Second Embodiment

In the first embodiment, the learned filter coefficient is reset at the timing at which it is determined that the speaker is switched, and the filter coefficient is relearned from the initial value and used. In a second embodiment, an example will be described in which a filter coefficient corresponding to a speaker situation after switching of speakers is read from a memory and used.

(Configuration of Sound Crosstalk Suppression Device)

Figure 6:
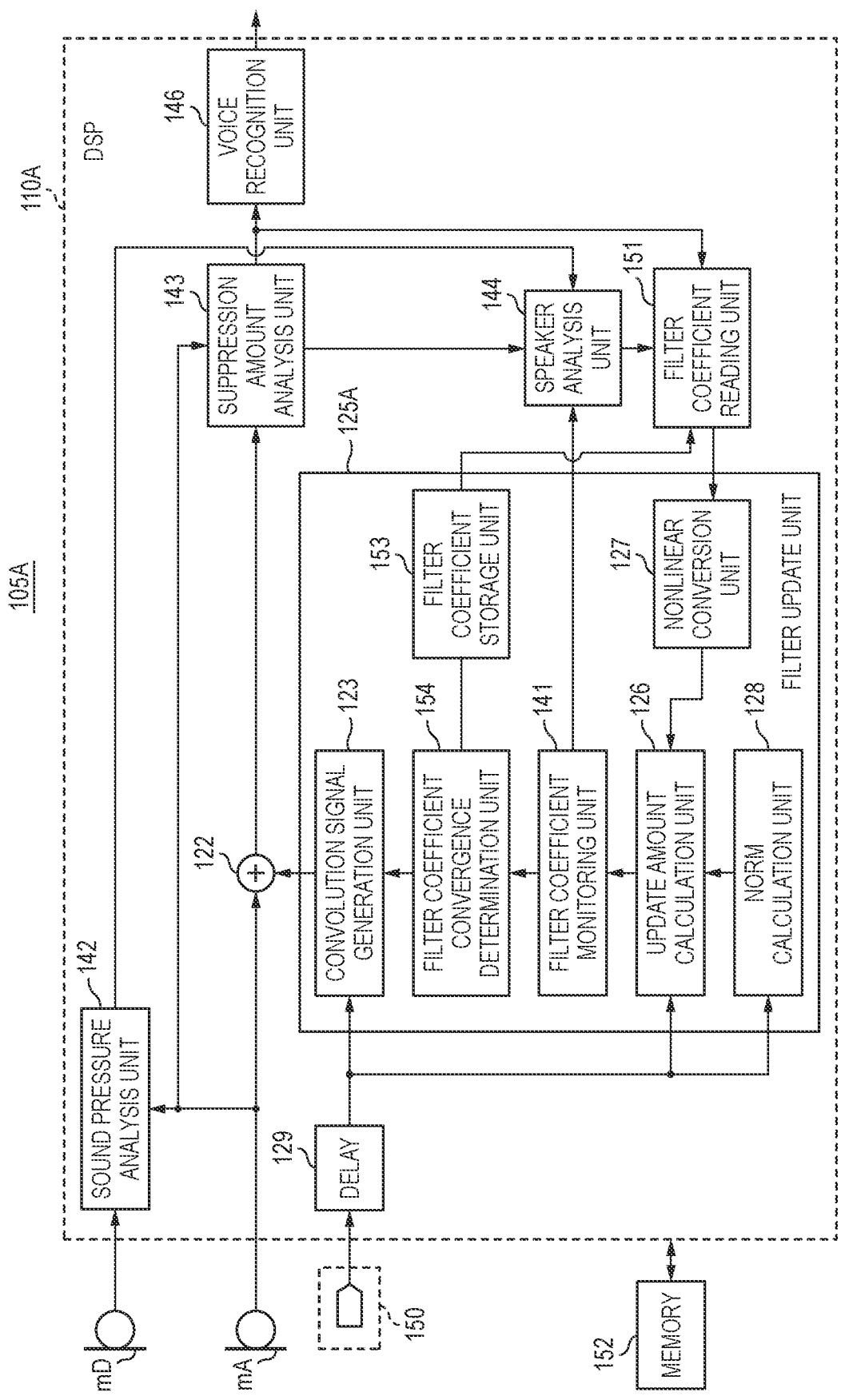
FIG. 6 is a block diagram showing a functional configuration example of a sound crosstalk suppression device according to a second embodiment.

FIG. 6 is a block diagram showing a functional configuration example of a sound crosstalk suppression device 105A according to the second embodiment. In the sound crosstalk suppression device 105A according to the second embodiment, the same components as those of the sound crosstalk suppression device 105 according to the first embodiment are denoted by the same reference numerals, description thereof will be simplified or omitted, and different contents will be described.

The sound crosstalk suppression device 105A according to the second embodiment is similarly configured with a DSP 110A. Compared with the sound crosstalk suppression device 105 according to the first embodiment, the sound crosstalk suppression device 105A includes a filter coefficient reading unit 151 without the filter reset unit 145. Further, a filter update unit 125A further includes a filter coefficient convergence determination unit 154 and a filter coefficient storage unit 153 as compared with the filter update unit 125.

The filter coefficient convergence determination unit 154 determines whether a filter coefficient calculated by the update amount calculation unit 126 converges. For example, when a variation width of the filter coefficient in a certain period is settled within a predetermined value, it is determined that the filter coefficient converges. Accordingly, the sound crosstalk suppression device 105A can determine that the filter coefficient converges at a stage where a variation of the filter coefficient is settled, and can grasp the convergence of the filter coefficient at an appropriate timing. The filter coefficient may be determined to converge when a score value exceeds a threshold as a result of voice recognition performed by the voice recognition unit 146 on a voice after suppression of a crosstalk component.

The filter coefficient storage unit 153 as an example of a memory stores the filter coefficient determined to converge by the filter coefficient convergence determination unit 154 in association with a speaker situation. The filter coefficient storage unit 153 is configured with, for example, a cache memory. Here, when the number of microphones arranged in front of occupants is two, the number of speaker situations (scenes) is four. Therefore, the filter coefficient storage unit 153 stores four filter coefficients.

The filter coefficient reading unit 151 reads the filter coefficient corresponding to the speaker situation analyzed by the speaker analysis unit 144 from the filter coefficient storage unit 153, and sets the filter coefficient as a value of a filter coefficient sequentially updated by the filter update unit 125A.

(Operation of Sound Crosstalk Suppression Device)

Next, an operation of the sound crosstalk suppression device 105A according to the second embodiment will be described.

Figure 7:
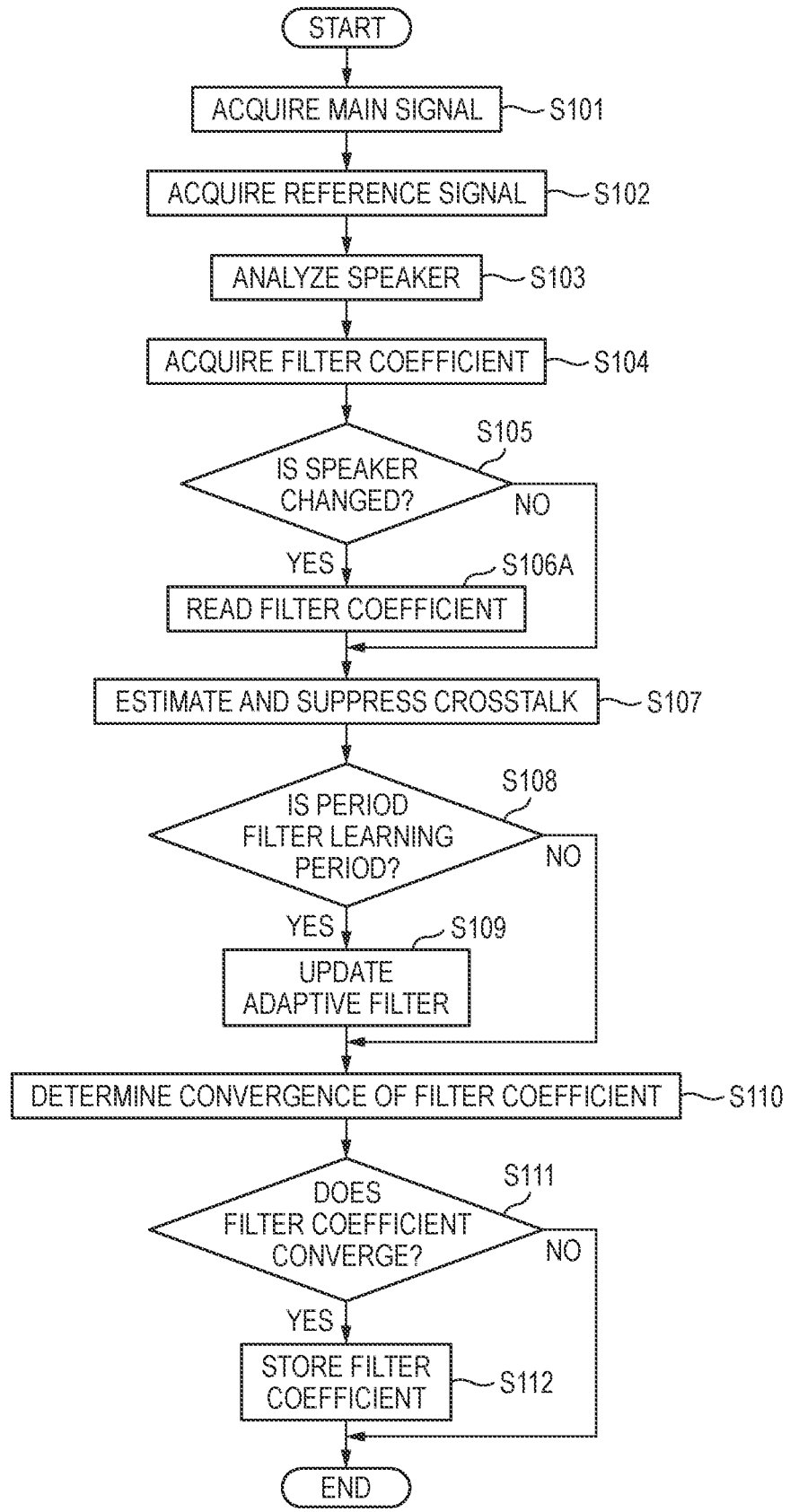
FIG. 7 is a flowchart showing an example of an operation procedure of the sound crosstalk suppression device according to the second embodiment.

FIG. 7 is a flowchart showing an example of an operation procedure of the sound crosstalk suppression device 105A according to the second embodiment. In description of FIG. 7, the same processing as the operation of the sound crosstalk suppression device 105 according to the first embodiment is denoted by the same step number, description thereof will be simplified or omitted, and different contents will be described.

In FIG. 7, after step S104, when the speaker analysis unit 144 determines that a speaker situation is changed (S105, YES), the filter coefficient reading unit 151 reads a filter coefficient that is corresponding to the speaker situation and that is stored in the filter coefficient storage unit 153 (S106A).

After step S106A, the convolution signal generation unit 123 performs a convolution processing on a reference signal by using the filter coefficient corresponding to the speaker situation read in step S106A, and generates a crosstalk suppression signal. The adder 122 subtracts the crosstalk suppression signal generated by the convolution signal generation unit 123 from a voice signal of a voice uttered by the main occupant A collected by the microphone mA, and suppresses a crosstalk component (here, a voice of the occupant D) included in the voice uttered by the main occupant A collected by the microphone mA.

After the crosstalk component is suppressed and the filter coefficient of the convolution signal generation unit 123 is updated in step S109, the filter coefficient convergence determination unit 154 determines whether the updated filter coefficient converges (S110). The filter coefficient convergence determination unit 154 determines whether the filter coefficient converges as a result of the determination (S111). When the filter coefficient converges (S111, YES), the filter coefficient storage unit 153 stores the filter coefficient corresponding to the updated speaker situation (S112). The filter coefficient is stored by overwriting, but may be additionally stored instead of overwriting. In contrast, when the filter coefficient does not converge (S111, NO), the filter coefficient storage unit 153 does not store the filter coefficient. Thereafter, the DSP 110 ends the processing of FIG. 7.

Immediately after the speaker is switched, the sound crosstalk suppression device 105A according to the second embodiment reads the filter coefficient learned in the past in association with the speaker situation after the switching, and uses the filter coefficient as the filter coefficient of the convolution signal generation unit 123. Accordingly, it is possible to expect suppression of the crosstalk component to some extent immediately after the switching of the speakers. Further, when the filter coefficient converges for a certain period, for example, in a case where a variation width of the filter coefficient is equal to or smaller than a predetermined value, the sound crosstalk suppression device 105A stores the convergent filter coefficient in the filter coefficient storage unit 153 as a candidate of a filter coefficient to be read next time. Accordingly, the sound crosstalk suppression device 105A can register the filter coefficient stored in the filter coefficient storage unit 153 as a latest learned filter coefficient corresponding to the speaker situation. Therefore, it is possible to further expect the suppression of the crosstalk component immediately after the switching of the speakers.

In this way, the sound crosstalk suppression device 105A analyzes, by the speaker analysis unit 144, the speaker situation in the vehicle cabin 108z based on respective voice signals collected by the two microphones mA and mD arranged in the vehicle cabin 108z (in a closed space) in which a plurality of occupants (a plurality of persons) including the occupant A who is a main speaker are present. The sound crosstalk suppression device 105A includes the convolution signal generation unit 123 that generates a suppression signal of the crosstalk component (that is, a crosstalk suppression signal) caused by utterance of another occupant D and included in a voice signal of the occupant A who is the main speaker, updates the filter coefficient of the convolution signal generation unit 123 for suppressing the crosstalk component, and stores an update result thereof in the filter coefficient storage unit 153 in association with the speaker situation by the filter update unit 125A. When it is determined that an analysis result of the speaker situation is switched from an immediately preceding speaker situation, the sound crosstalk suppression device 105A suppresses, by the adder 122, a crosstalk component included in the voice signal of the occupant A by using a suppression signal of the crosstalk component generated by the convolution signal generation unit 123. When it is determined that the analysis result of the speaker situation is switched from the immediately preceding speaker situation, the filter update unit 125A generates the suppression signal of the crosstalk component by the convolution signal generation unit 123 by using a filter coefficient corresponding to the analysis result of the speaker situation.

Accordingly, the sound crosstalk suppression device 105A can adaptively suppress the sound crosstalk component that may be included in the uttered voice of the occupant A who is the main speaker, in accordance with the speaker situation of the plurality of occupants (for example, the occupants A and D) in the vehicle cabin 108z, and can improve the sound quality of the uttered voice of the occupant A. Further, by reading the filter coefficient corresponding to the speaker situation from the cache memory, as compared with a case where the same filter coefficient is continuously updated regardless of the speaker situation, it can be expected that sound quality of the uttered voice of the main speaker is improved by using the filter coefficient corresponding to the speaker situation and convergence of the updated filter coefficient is accelerated.

When convergence of an update of the filter coefficient based on the voice signal of the other occupant D is determined, the filter update unit 125A stores a convergence result of the update of the filter coefficient in the filter coefficient storage unit 153 in association with a current speaker situation from the speaker analysis unit 144. Accordingly, the sound crosstalk suppression device 105A can suppress the crosstalk component in real time by using the convergent filter coefficient when the same speaker situation occurs next time.

The filter coefficient convergence determination unit 154 determines whether the update of the filter coefficient converges based on the variation width of the filter coefficient in a certain period on the time axis. Accordingly, the sound crosstalk suppression device 105A can determine the convergence of the filter coefficient at an appropriate timing at which the variation of the filter coefficient is settled.

Modification of First Embodiment

In the first embodiment, the filter coefficient is always reset when the speaker is switched, but it is assumed that the filter coefficient is not necessarily reset depending on a speaker situation in an environment in a closed space such as the vehicle 108. For example, in a speaker situation in which a voice of the occupant A is a voice recognition target and a voice of the occupant D is a crosstalk component, a case where another occupant C joins with a low voice is exemplified. When there is such a change in the speaker situation, in a modification of the first embodiment, it is possible to suppress the crosstalk component by using a filter coefficient before the speaker situation changes without resetting the filter coefficient.

(Configuration of Sound Crosstalk Suppression Device)

Figure 8:
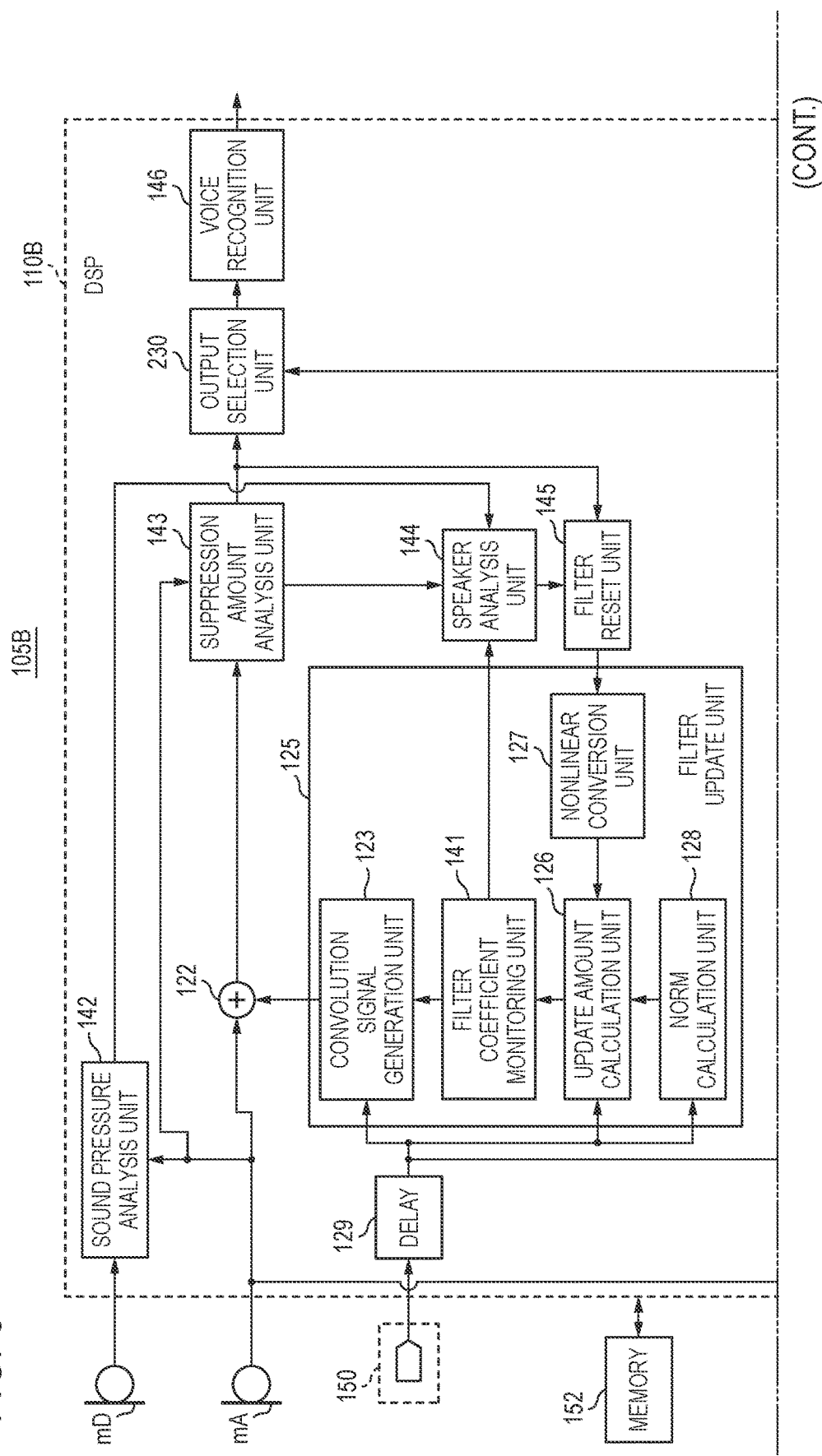
FIG. 8 is a block diagram showing a functional configuration example of a sound crosstalk suppression device according to a modification of the first embodiment.

FIG. 8 is a block diagram showing a functional configuration example of a sound crosstalk suppression device 105B according to the modification of the first embodiment. In the sound crosstalk suppression device 105B according to the modification of the first embodiment, the same components as those of the sound crosstalk suppression device 105 according to the first embodiment are denoted by the same reference numerals, description thereof will be simplified or omitted, and different contents will be described.

The sound crosstalk suppression device 105B according to the modification of the first embodiment is similarly configured with a DSP 110B. The sound crosstalk suppression device 105B further includes an adder 222, a filter update unit 225, and an output selection unit 230 in addition to the functional configuration of the DSP 110 according to the first embodiment.

Similar to the adder 122, the adder 222 as an example of a crosstalk suppression unit suppresses the crosstalk component (for example, the voice of the occupant D) included in a voice uttered by the main occupant A and collected by the microphone mA by subtracting a crosstalk suppression signal generated by the filter update unit 225 from a voice signal of the voice uttered by the main occupant A and collected by the microphone mA.

The filter update unit 225 generates a crosstalk suppression signal for suppressing (subtracting) the crosstalk component included in the voice collected by the microphone mA based on a voice signal after crosstalk suppression collected by the microphone mA and a reference signal collected by the microphone mD and shifted by a delay time. The filter update unit 225 includes a convolution signal generation unit 223, an update amount calculation unit 226, a nonlinear conversion unit 227, and a norm calculation unit 228.

Since functions of the convolution signal generation unit 223, the update amount calculation unit 226, the nonlinear conversion unit 227, and the norm calculation unit 228 are the same as those of the convolution signal generation unit 123, the update amount calculation unit 126, the nonlinear conversion unit 127, and the norm calculation unit 128, respectively, description thereof will be omitted. However, even when it is determined that the speaker is switched, the filter update unit 225 uses a filter coefficient of the convolution signal generation unit 223 without resetting the filter coefficient.

When it is determined that the speaker is not switched, the output selection unit 230 selects a voice signal after crosstalk suppression, which is suppressed using the crosstalk suppression signal generated by the filter update unit 125 or the filter update unit 225. When it is determined that the speaker is switched, the output selection unit 230 selects a voice signal after suppression of the crosstalk component using the filter update unit 125 according to the first embodiment that resets the filter coefficient or a voice signal after suppression of the crosstalk component using the filter update unit 225 that does not reset the filter coefficient, based on a speaker situation after the switching.

When selecting the voice signal after the suppression of the crosstalk component, the output selection unit 230 selects any one of the voice signal after the suppression of the crosstalk component using the filter update unit 225 and the voice signal after the suppression of the crosstalk component using the filter update unit 125 based on a predetermined determination criterion. For example, the output selection unit 230 may select a voice signal after suppression of the crosstalk component having a higher score value as a result of voice recognition by the voice recognition unit 146. Further, the output selection unit 230 may select a voice signal after suppression of the crosstalk component of which a time until the filter coefficient converges is shorter. The output selection unit 230 may select, in advance, any one of the voice signal after the suppression of the crosstalk component using the filter update unit 225 and the voice signal after the suppression of the crosstalk component using the filter update unit 125 in accordance with a switching operation of a user.

The output selection unit 230 may select a voice signal after suppression of the crosstalk component in accordance with a speaker situation. For example, in a speaker situation in which the voice of the occupant A is a voice recognition target and the voice of the occupant D is crosstalk, when the other occupant C adds the low voice or the like, the output selection unit 230 selects the voice signal after the suppression of the crosstalk component, which is suppressed using the crosstalk suppression signal generated by the filter update unit 225. In contrast, when there is no large difference between a sound volume of the voice of the occupant C and a sound volume of the voice of the occupant D, the output selection unit 230 selects the voice signal after the suppression of the crosstalk component, which is suppressed using the crosstalk suppression signal generated by the filter update unit 125.

(Operation of Sound Crosstalk Suppression Device)

Figure 9:
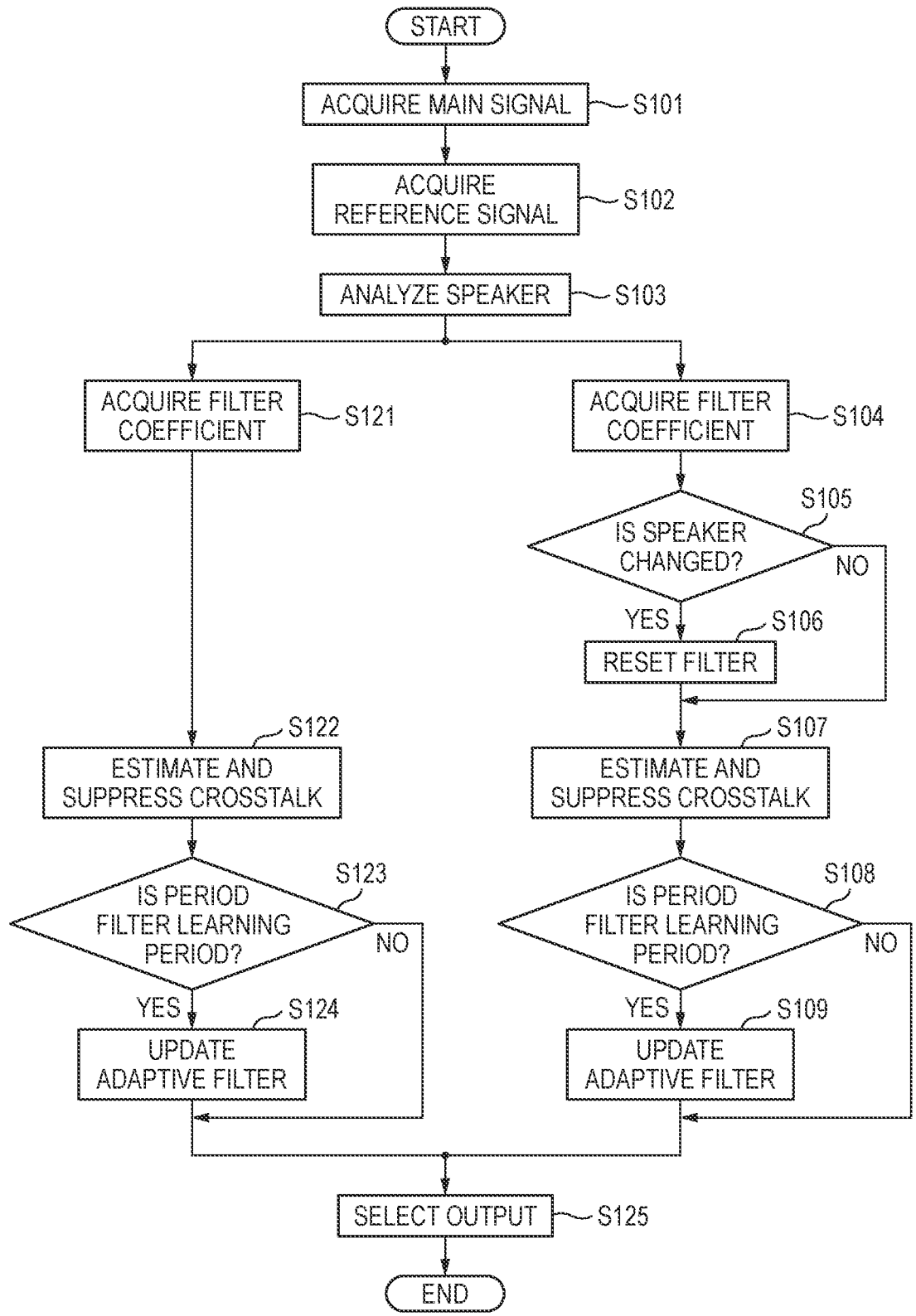
FIG. 9 is a flowchart showing an example of an operation procedure of the sound crosstalk suppression device according to the modification of the first embodiment.

FIG. 9 is a flowchart showing an example of an operation procedure of the sound crosstalk suppression device 105B according to the modification of the first embodiment. In description of FIG. 9, the same processing as the operation of the sound crosstalk suppression device 105 according to the first embodiment is denoted by the same step number, description thereof will be simplified or omitted, and different contents will be described.

In FIG. 9, after step S102, when the speaker situation is analyzed by the speaker analysis unit 144, the sound crosstalk suppression device 105B executes a series of processings of steps S104 to S109 as in the first embodiment. That is, when it is determined that the speaker situation is changed (switched), the sound crosstalk suppression device 105B resets the filter coefficient to an initial value, and suppresses the crosstalk component from the voice signal (main signal) collected by the microphone mA by using the convolution signal generation unit 123 while relearning the filter coefficient in accordance with the switched speaker situation.

The sound crosstalk suppression device 105B performs processings of steps S121 to S124 in parallel with the series of processings of steps S104 to S109. That is, even when it is determined that the speaker situation is changed (switched), the sound crosstalk suppression device 105B suppresses the crosstalk component from the voice signal (main signal) collected by the microphone mA by using the convolution signal generation unit 223 while learning the filter coefficient as necessary without resetting the filter coefficient.

Specifically, the filter update unit 225 acquires the filter coefficient of the convolution signal generation unit 223 calculated by the update amount calculation unit 226 (S121). The convolution signal generation unit 223 performs convolution processing on the reference signal by using the filter coefficient calculated by the update amount calculation unit 226, and generates a crosstalk suppression signal (S122). The adder 222 suppresses (subtracts) the crosstalk suppression signal generated by the convolution signal generation unit 223 from the voice signal of the voice collected by the microphone mA, and suppresses the crosstalk component included in the voice collected by the microphone mA.

Subsequently, the sound crosstalk suppression device 105B determines whether a period is a filter learning period (S123). The filter learning period is, for example, a period during which someone other than the occupant A who is the main speaker utters in order to learn a filter coefficient for suppressing the crosstalk component included in the voice of the occupant A who is the main speaker. Further, a period that is not the filter learning period is a period during which no occupant other than the occupant A utters. When a period is the filter learning period (S123, YES), the filter update unit 225 updates the filter coefficient of the convolution signal generation unit 223 with the filter coefficient calculated by the update amount calculation unit 226, and stores an update result thereof in the memory 152 (S124). In contrast, when a period is not the filter learning period (S123, NO), the sound crosstalk suppression device 105B does not update the filter coefficient of the convolution signal generation unit 223.

The output selection unit 230 selects any one of the voice signal after the suppression of the crosstalk component using the convolution signal generation unit 123 and the voice signal after the suppression of the crosstalk component using the convolution signal generation unit 223 (S125). Thereafter, the sound crosstalk suppression device 105B ends the operation of FIG. 9.

The sound crosstalk suppression device 105B according to the modification of the first embodiment can select any one of the voice signal after the crosstalk suppression using the filter update unit 225 and the voice signal after the crosstalk suppression using the filter update unit 125. Therefore, for example, as a result of the voice recognition by the voice recognition unit 146, the sound crosstalk suppression device 105B selects the voice signal after the crosstalk suppression having the higher score value, so that a voice recognition rate can be increased and sound quality of the uttered voice is improved. Further, the sound crosstalk suppression device 105B selects the voice signal after the crosstalk suppression of which the time until the filter coefficient converges is shorter, so that the time until the sound quality of the target voice is stabilized can be shortened.

In this way, the sound crosstalk suppression device 105B includes the convolution signal generation unit 223 (an example of a second filter) that generates the crosstalk suppression signal (an example of a second suppression signal of the crosstalk component) caused by the utterance of the occupant D and included in the voice signal of the occupant A, updates the filter coefficient of the convolution signal generation unit 223 for suppressing the crosstalk component, and stores an update result thereof in the memory 152 by the filter update unit 225 (an example of a second filter update unit). The sound crosstalk suppression device 105B suppresses, by the adder 222 (an example of a second crosstalk suppression unit), the crosstalk component included in the voice signal of the occupant A by using the crosstalk suppression signal generated by the convolution signal generation unit 223. The sound crosstalk suppression device 105B selects and outputs, by the output selection unit 230, any one of the voice signal (an example of a first output signal) after the crosstalk suppression from the adder 122 and the voice signal (an example of a second output signal) after the crosstalk suppression from the adder 222.

Accordingly, the sound crosstalk suppression device 105B can select and output the voice signal after the crosstalk suppression in which the crosstalk component is suppressed using the filter coefficient reset when the speaker situation is changed and the voice signal after the crosstalk suppression in which the crosstalk component is suppressed using the filter coefficient that is not reset when the speaker situation is changed. Therefore, the sound crosstalk suppression device 105B can select, for example, a voice signal after crosstalk suppression having better sound quality of the voice of the occupant A.

The output selection unit 230 selects and outputs the voice signal after the crosstalk suppression based on a result of the voice recognition of the voice signal of the occupant A in which the crosstalk component is suppressed. Accordingly, the sound crosstalk suppression device 105B can select a signal having a higher score value for the voice recognition. Therefore, the sound quality of the uttered voice of the occupant A is improved.

Modification of Second Embodiment

Figure 12:
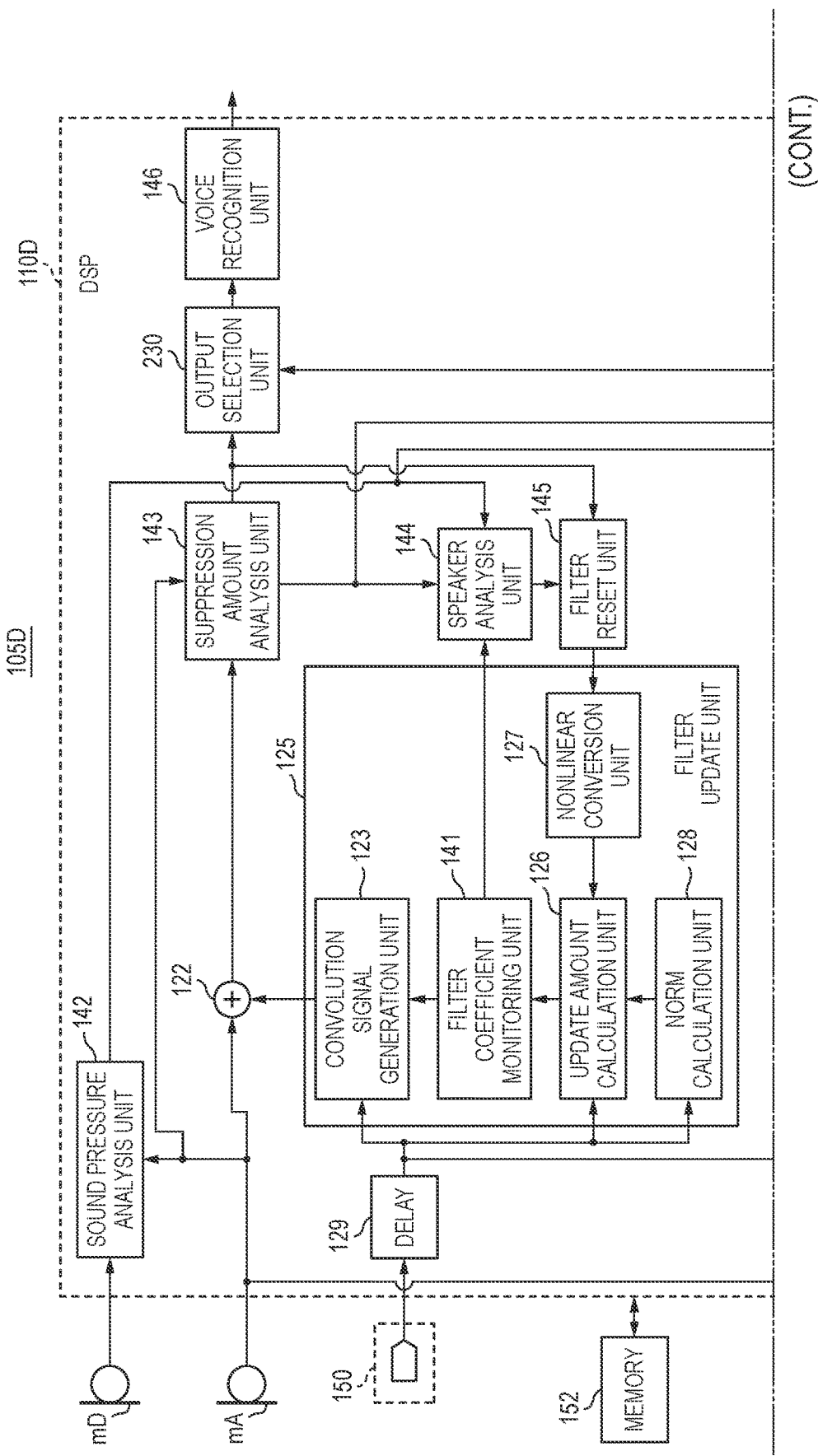
FIG. 12 is a block diagram showing a functional configuration example of a sound crosstalk suppression device according to a third embodiment.

In a modification of the second embodiment, similar to the modification of the first embodiment, depending on a speaker situation in an environment in a closed space such as the vehicle 108, when it is determined that a speaker is switched, a sound crosstalk suppression device 105C can suppress a crosstalk component by using a filter coefficient before the speaker situation is changed without reading a filter coefficient corresponding to a speaker situation after the change from the filter coefficient storage unit 153B (see FIG. 12).

(Configuration of Sound Crosstalk Suppression Device)

Figure 10:
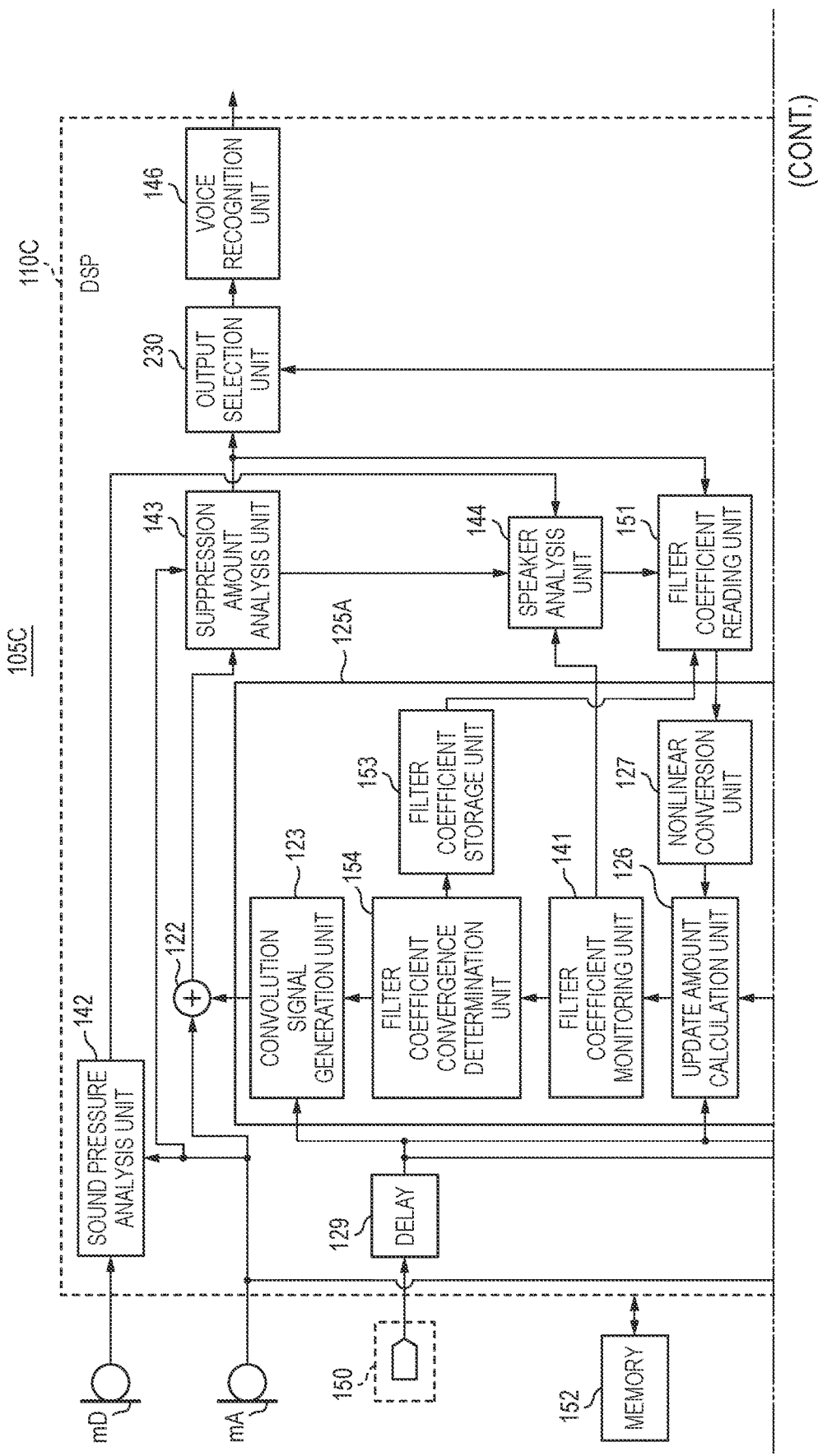
FIG. 10 is a block diagram showing a functional configuration example of a sound crosstalk suppression device according to a modification of the second embodiment.

FIG. 10 is a block diagram showing a functional configuration example of the sound crosstalk suppression device 105C according to the modification of the second embodiment. In the sound crosstalk suppression device 105C according to the modification of the second embodiment, the same components as those of the sound crosstalk suppression device 105A according to the second embodiment and the sound crosstalk suppression device 105B according to the modification of the first embodiment are denoted by the same reference numerals, description thereof will be simplified or omitted, and different contents will be described.

The sound crosstalk suppression device 105C according to the modification of the second embodiment is similarly configured with a DSP 110C. The sound crosstalk suppression device 105C further includes the adder 222, the filter update unit 225, and the output selection unit 230 in addition to the functional configuration of the DSP 110A according to the second embodiment, similar to the modification of the first embodiment.

The output selection unit 230 selects any one of a voice signal after suppression of the crosstalk component using the filter update unit 225 and a voice signal after suppression of the crosstalk component using the filter update unit 125A by the same method as in the modification of the first embodiment.

The output selection unit 230 selects any one of the voice signal after the suppression of the crosstalk component using the filter update unit 225 and the voice signal after the suppression of the crosstalk component using the filter update unit 125A based on a predetermined determination criterion. For example, the output selection unit 230 may select a voice signal after suppression of the crosstalk component having a higher score value as a result of voice recognition by the voice recognition unit 146. Further, the output selection unit 230 may select a voice signal after suppression of the crosstalk component of which a time until the filter coefficient converges is shorter. Further, the output selection unit 230 may select the voice signal after the suppression of the crosstalk component in accordance with a speaker situation, as in the modification of the first embodiment. The output selection unit 230 may select in advance any one of the voice signal after the suppression of the crosstalk component using the filter update unit 225 and the voice signal after the suppression of the crosstalk component using the filter update unit 125A in accordance with a switching operation of the user.

(Operation of Sound Crosstalk Suppression Device)

Figure 11:
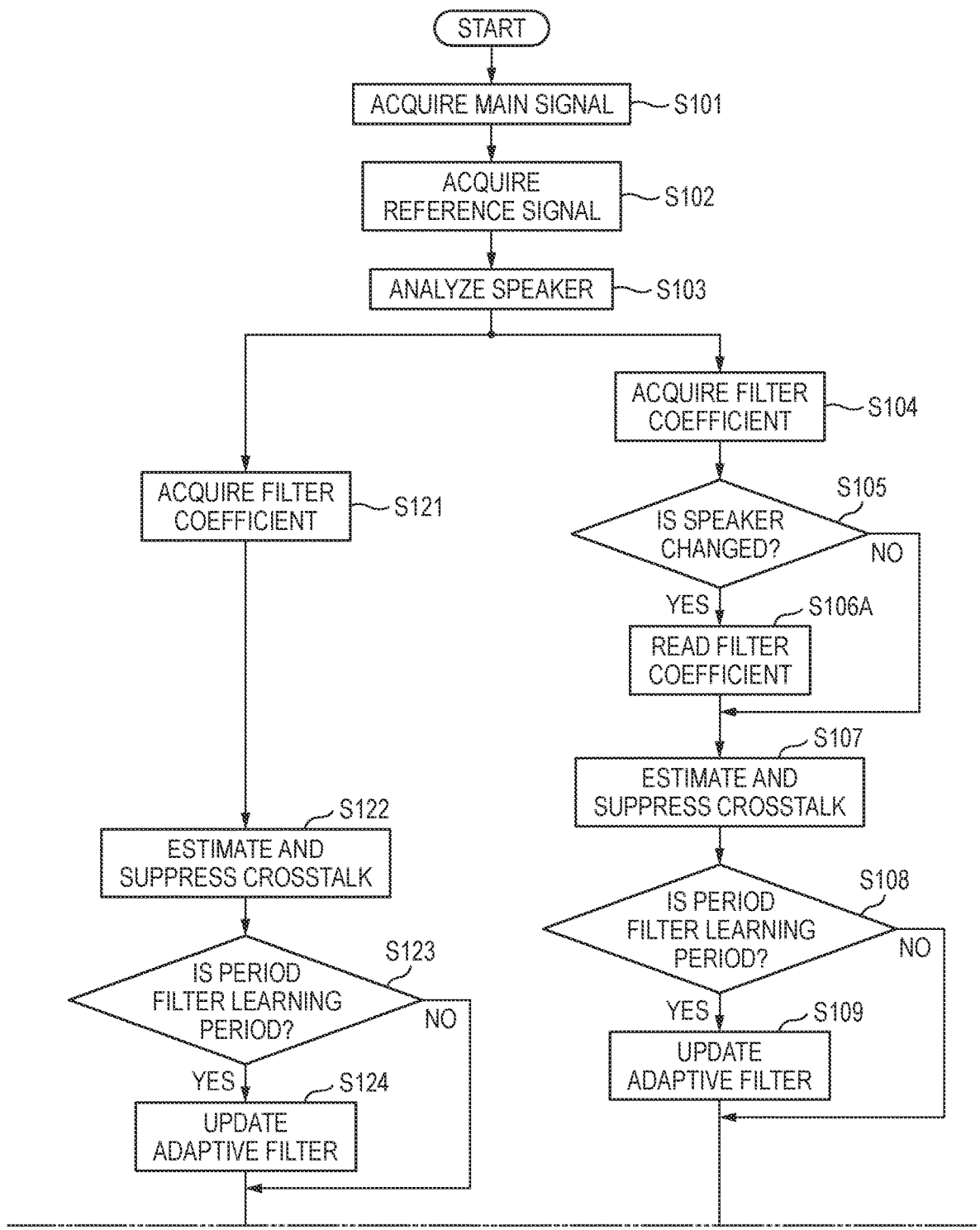
FIG. 11 is a flowchart showing an example of an operation procedure of the sound crosstalk suppression device according to the modification of the second embodiment.

FIG. 11 is a flowchart showing an example of an operation procedure of the sound crosstalk suppression device 105C according to the modification of the second embodiment. In description of FIG. 11, the same processings as those of the operation of the sound crosstalk suppression device 105A according to the second embodiment or the operation of the sound crosstalk suppression device 105B according to the modification of the first embodiment are denoted by the same step numbers, description thereof will be simplified or omitted, and different contents will be described.

In FIG. 11, after step S102, when a speaker situation is analyzed by the speaker analysis unit 144, the sound crosstalk suppression device 105C executes the series of processings of steps S104 to S112 as in the second embodiment. That is, when it is determined that the speaker situation is changed (switched), the sound crosstalk suppression device 105C reads a filter coefficient learned in the past, and suppresses the crosstalk component by using the convolution signal generation unit 123. Further, the sound crosstalk suppression device 105C performs the series of processings of steps S121 to S124 in parallel with the series of processings of steps S104 to S112 as in the modification of the first embodiment. That is, the sound crosstalk suppression device 105C suppresses the crosstalk component by using the convolution signal generation unit 223 without reading the filter coefficient learned in the past.

In step S125, the output selection unit 230 selects any one of the voice signal after the suppression of the crosstalk component using the filter update unit 125A and the voice signal after the suppression of the crosstalk component using the filter update unit 225.

The sound crosstalk suppression device 105C according to the modification of the second embodiment can select any one of the voice signal after the suppression of the crosstalk component using the filter update unit 125A and the voice signal after the suppression of the crosstalk component using the filter update unit 225. Therefore, for example, as a result of the voice recognition by the voice recognition unit 146, the sound crosstalk suppression device 105C selects a voice signal after suppression of the crosstalk component having a higher score value, so that a voice recognition rate can be increased and sound quality of the uttered voice is improved. Further, the sound crosstalk suppression device 105C selects a voice signal after suppression of the crosstalk component of which a time until the filter coefficient converges is shorter, so that a time until sound quality of a voice uttered by a main speaker (for example, the occupant A) who is a voice recognition target is stabilized can be shortened.

In this way, the sound crosstalk suppression device 105C includes the convolution signal generation unit 223 (an example of a second filter) that generates a crosstalk suppression signal (an example of a second suppression signal of the crosstalk component) caused by utterance of the occupant D and included in a voice signal of the occupant A, updates the filter coefficient of the convolution signal generation unit 223 for suppressing the crosstalk component, and stores an update result thereof in the memory 152 by the filter update unit 225. The sound crosstalk suppression device 105C suppresses, by the adder 222, a crosstalk component included in the voice signal of the occupant A by using the crosstalk suppression signal generated by the convolution signal generation unit 223. The sound crosstalk suppression device 105C selects and outputs, by the output selection unit 230, any one of the voice signal (an example of a first output signal) after the crosstalk suppression from the adder 122 and the voice signal (an example of a second output signal) after the crosstalk suppression from the adder 222.

Accordingly, the sound crosstalk suppression device 105C can select and output the voice signal after the crosstalk suppression in which the crosstalk component is suppressed using the filter coefficient corresponding to a speaker situation stored in the filter coefficient storage unit 153 (for example, a cache memory) when the speaker situation is changed and the voice signal after the crosstalk suppression in which the crosstalk component is suppressed using the filter coefficient that is not read when the speaker situation is changed. Therefore, the sound crosstalk suppression device 105C can select, for example, a voice signal after crosstalk suppression having better sound quality of the voice of the occupant A.

The output selection unit 230 selects and outputs the voice signal after the crosstalk suppression based on a result of the voice recognition of the voice signal of the occupant A in which the crosstalk component is suppressed. Accordingly, the sound crosstalk suppression device 105C can select a signal having a higher score value for the voice recognition. Therefore, the sound quality of the uttered voice of the occupant A is improved.

Third Embodiment

In a third embodiment, a case is described in which a sound crosstalk suppression device can select between the method of resetting the filter coefficient to the initial value and relearning the filter coefficient when the speaker is switched as described in the first embodiment and the method of reading the filter coefficient learned in the past as described in the second embodiment.

(Configuration of Sound Crosstalk Suppression Device)

FIG. 12 is a block diagram showing a functional configuration example of a sound crosstalk suppression device 105D according to the third embodiment. The sound crosstalk suppression device 105D further includes the output selection unit 230 in addition to the functional configurations of the sound crosstalk suppression device 105 according to the first embodiment and the sound crosstalk suppression device 105A according to the second embodiment. In the sound crosstalk suppression device 105D, the same components as those of the sound crosstalk suppression device 105 according to the first embodiment and the sound crosstalk suppression device 105A according to the second embodiment are denoted by the same reference numerals, description thereof will be simplified or omitted, and different contents will be described. For example, the adder 122 of the second embodiment and an adder 122B of the third embodiment have the same configuration. Further, the filter update unit 125A of the second embodiment and a filter update unit 125B of the third embodiment have the same configuration. The same applies to the other units, and description thereof will be omitted.

The output selection unit 230 selects any one of a voice signal after suppression of the crosstalk component using the filter update unit 125 and a voice signal after suppression of the crosstalk component using the filter update unit 125B based on a predetermined determination criterion. For example, the output selection unit 230 may select a voice signal after the crosstalk suppression having a higher score value as a result of voice recognition by the voice recognition unit 146. Further, the output selection unit 230 may select a voice signal after suppression of the crosstalk component of which a time until a filter coefficient converges is shorter. Further, the output selection unit 230 may select a voice signal after suppression of the crosstalk component in accordance with a speaker situation, as in the modification of the first embodiment. The output selection unit 230 may select in advance any one of the voice signal after the suppression of the crosstalk component using the filter update unit 125 and the voice signal after the suppression of the crosstalk component using the filter update unit 125B in accordance with a switching operation of the user.

(Operation of Sound Crosstalk Suppression Device)

Figure 13:
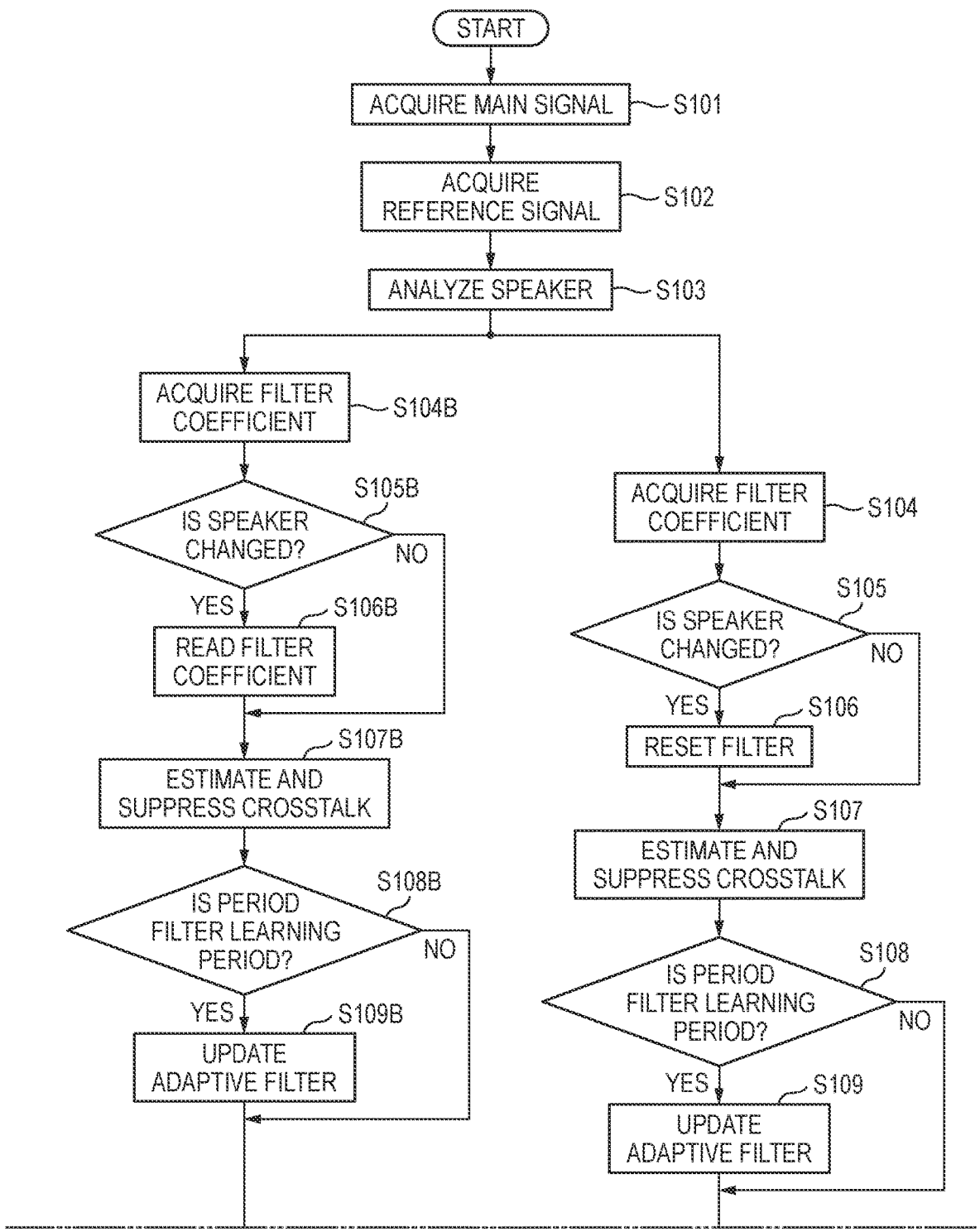
FIG. 13 is a flowchart showing an example of an operation procedure of the sound crosstalk suppression device according to the third embodiment.

FIG. 13 is a flowchart showing an example of an operation procedure of the sound crosstalk suppression device 105D according to the third embodiment. In description of FIG. 13, the same processings as those of the operation of the sound crosstalk suppression device 105 according to the first embodiment or the operation of the sound crosstalk suppression device 105A according to the second embodiment are denoted by the same step numbers, description thereof will be simplified or omitted, and different contents will be described.

In FIG. 13, after step S102, when a speaker situation is analyzed by the speaker analysis unit 144, the sound crosstalk suppression device 105D executes the series of processings of steps S104 to S109 of the first embodiment. That is, when it is determined that the speaker situation is changed (switched), the sound crosstalk suppression device 105D resets the filter coefficient to an initial value and suppresses the crosstalk component by using the convolution signal generation unit 123 while relearning a filter coefficient.

Further, the sound crosstalk suppression device 105D executes a series of processings of steps S104B to S112B in parallel with the series of processings of steps S104 to S109 as in the second embodiment. That is, when it is determined that the speaker situation is changed (switched), the sound crosstalk suppression device 105D reads a filter coefficient learned in the past, and suppresses the crosstalk component by using a convolution signal generation unit 123B.

In step S125, the output selection unit 230 selects any one of the voice signal after the suppression of the crosstalk component of the first embodiment using the convolution signal generation unit 123 and the voice signal after the suppression of the crosstalk component of the second embodiment using the convolution signal generation unit 123B.

The sound crosstalk suppression device 105D according to the third embodiment can select any one of the voice signal after the suppression of the crosstalk component of the first embodiment and the voice signal after the suppression of the crosstalk component of the second embodiment. Therefore, for example, the sound crosstalk suppression device 105D selects a voice signal after suppression of the crosstalk component having a higher score value, so that a voice recognition rate can be increased and sound quality of an uttered voice is improved. Further, the sound crosstalk suppression device 105D selects a voice signal after suppression of the crosstalk component of which a time until the filter coefficient converges is shorter, so that a time until sound quality of a target voice is stabilized can be shortened.

In this way, the sound crosstalk suppression device 105D includes the convolution signal generation unit 123B (second filter) that generates a crosstalk suppression signal (an example of a second suppression signal of the crosstalk component) caused by utterance of the occupant D and included in a voice signal of the occupant A, updates the filter coefficient of the convolution signal generation unit 123B for suppressing the crosstalk component, and stores an update result thereof in the filter coefficient storage unit 153B (an example of a second memory) in association with a speaker situation by the filter update unit 125B. The sound crosstalk suppression device 105D suppresses, by the adder 122B (an example of a second crosstalk suppression unit), a crosstalk component included in the voice signal of the occupant A by using the crosstalk suppression signal generated by the convolution signal generation unit 123B. The sound crosstalk suppression device 105D selects and outputs, by the output selection unit 230, any one of the voice signal (an example of a first output signal) after the crosstalk suppression from the adder 122 and the voice signal (an example of a second output signal) after the crosstalk suppression from the adder 122B. When it is determined that an analysis result of a speaker situation is switched from an immediately preceding speaker situation, the filter update unit 125B generates the crosstalk suppression signal by the convolution signal generation unit 123B by using the filter coefficient of the convolution signal generation unit 123B corresponding to the analysis result of the speaker situation.

Accordingly, the sound crosstalk suppression device 105D can select and output the voice signal after the crosstalk suppression in which the crosstalk component is suppressed using the filter coefficient reset when a speaker situation is changed and the voice signal after the crosstalk suppression in which the crosstalk component is suppressed using the filter coefficient corresponding to a speaker situation stored in the cache memory when the speaker situation is changed. Therefore, the sound crosstalk suppression device 105D can select, for example, a voice signal after the crosstalk suppression having better sound quality of a voice of the occupant A.

The output selection unit 230 selects and outputs the voice signal after the crosstalk suppression based on a result of the voice recognition of the voice signal of the occupant A in which the crosstalk component is suppressed. Accordingly, the sound crosstalk suppression device 105D can select a signal having a higher score value for the voice recognition. Therefore, the sound quality of the uttered voice of the occupant A is improved.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in various embodiments described above may be combined optionally in a range without deviating from the spirit of the invention.

For example, in the above-described embodiments, the case where the number of microphones arranged in the vehicle cabin is two has been described, but three or more microphones may be arranged in the vehicle cabin. In this case, each of the sound crosstalk suppression devices 105, 105A, 105B, 105C, and 105D includes sets of delays and filter update units as many as the number of microphones except for the microphone to which the main signal is input. For example, when the number of microphones is four, each of the sound crosstalk suppression devices 105, 105A, 105B, 105C, and 105D is provided with a configuration corresponding to a combination of three sets of delays and filter update units.

The present application is based on Japanese patent application filed on Nov. 21, 2019 (Japanese Patent Application No. 2019-210689), the contents of which are incorporated herein by reference.

INDUSTRIAL APPLICABILITY

The present disclosure is useful as a sound crosstalk suppression device and a sound crosstalk suppression method that adaptively suppress a sound crosstalk component that may be included in an uttered voice of a main speaker and that improve sound quality of the uttered voice of the main speaker in accordance with a speaker situation of a plurality of occupants present in a closed space such as a vehicle cabin in the sound crosstalk suppression device.

REFERENCE SIGNS LIST 105, 105A, 105B, 105C, 105D sound crosstalk suppression device
108 vehicle
108z vehicle cabin
122, 222 adder
123, 123B, 223 convolution signal generation unit
125, 125A, 125B, 225 filter update unit
126, 126B, 226 update amount calculation unit
127, 127B, 227 nonlinear conversion unit
128, 128B, 228 norm calculation unit
129 delay
141, 141B filter coefficient monitoring unit
142 sound pressure analysis unit
143 suppression amount analysis unit
144 speaker analysis unit
145 filter reset unit
146 voice recognition unit
150, 152 memory
151, 151B filter coefficient reading unit
153 filter coefficient storage unit
154, 154B filter coefficient convergence determination unit
230 output selection unit
mA, mD microphone

The invention claimed is:

1. A sound crosstalk suppression device, comprising:
a speaker analysis unit configured to analyze a speaker situation in a closed space based on voice signals respectively collected by a plurality of microphones arranged in the closed space in which a plurality of persons including a main speaker are present;
a filter update unit that comprises a filter configured to generate a suppression signal of a crosstalk component caused by utterance of another speaker and included in a voice signal of the main speaker, that is configured to update a parameter of the filter for suppressing the crosstalk component, and that is configured to store an update result of the parameter of the filter in a memory in association with the speaker situation;
a reset unit configured to reset the parameter of the filter stored in the memory in a case where an analysis result of the speaker situation is switched from an immediately preceding speaker situation; and
a crosstalk suppression unit configured to suppress the crosstalk component included in the voice signal of the main speaker by using the suppression signal generated by the filter,
wherein the filter update unit updates the parameter of the filter based on the voice signal of the another speaker after the parameter of the filter is reset, and
the speaker analysis unit analyzes whether there is a change in the speaker situation in the closed space in accordance with a comparison between levels of the voice signals respectively collected by the plurality of microphones and thresholds.

2. The sound crosstalk suppression device according to claim 1, further comprising:
a second filter update unit that comprises a second filter configured to generate a second suppression signal of the crosstalk component caused by utterance of the another speaker and included in the voice signal of the main speaker, that is configured to update a parameter of the second filter for suppressing the crosstalk component, and that is configured to store an update result of the parameter of the second filter in a memory;
a second crosstalk suppression unit configured to suppress the crosstalk component included in the voice signal of the main speaker by using the second suppression signal generated by the second filter; and
an output selection unit configured to select and output any one of a first output signal from the crosstalk suppression unit and a second output signal from the second crosstalk suppression unit.

3. The sound crosstalk suppression device according to claim 2,
wherein the output selection unit selects and outputs the first output signal or the second output signal based on a result of voice recognition of the voice signal of the main speaker in which the crosstalk component is suppressed.

4. A sound crosstalk suppression method executed by a sound crosstalk suppression device, the sound crosstalk suppression method comprising:
- analyzing a speaker situation in a closed space based on voice signals respectively collected by a plurality of microphones arranged in the closed space in which a plurality of persons including a main speaker are present;
- updating a parameter of a filter that generates a suppression signal of a crosstalk component caused by utterance of another speaker and included in a voice signal of the main speaker, and storing an update result of the parameter of the filter in a memory in association with the speaker situation;
- resetting the parameter of the filter stored in the memory in a case where an analysis result of the speaker situation is switched from an immediately preceding speaker situation; and
- suppressing the crosstalk component included in the voice signal of the main speaker by using the suppression signal generated by the filter,
- wherein the parameter is updated based on a voice signal of the another speaker after the parameter of the filter is reset, and
- the sound crosstalk suppression method analyzes whether there is a change in the speaker situation in the closed space in accordance with a comparison between levels of the voice signals respectively collected by the plurality of microphones and thresholds.

5. A sound crosstalk suppression device, comprising:
a processor; and
a memory including a program that, when executed by the processor, causes the processor to execute processing, the processing including:
- analyzing a speaker situation in a closed space based on voice signals respectively collected by a plurality of microphones arranged in the closed space in which a plurality of persons including a main speaker are present;
- updating a parameter of a filter that generates a suppression signal of a crosstalk component caused by utterance of another speaker and included in a voice signal of the main speaker, and storing an update result of the parameter of the filter in a memory in association with the speaker situation;
- resetting the parameter of the filter stored in the memory in a case where an analysis result of the speaker situation is switched from an immediately preceding speaker situation; and
- suppressing the crosstalk component included in the voice signal of the main speaker by using the suppression signal generated by the filter,
wherein the processor updates the parameter of the filter based on the voice signal of the another speaker after the parameter of the filter is reset, and
the processor analyzes whether there is a change in the speaker situation in the closed space in accordance with a comparison between levels of the voice signals respectively collected by the plurality of microphones and thresholds.

* * * * *